US012491310B2

(12) United States Patent
Nazzaro et al.

(10) Patent No.: US 12,491,310 B2
(45) Date of Patent: Dec. 9, 2025

(54) WEARABLE DRUG DELIVERY DEVICE WITH REMOVAL ELEMENT

(71) Applicant: Insulet Corporation, Acton, MA (US)

(72) Inventors: David Nazzaro, Groveland, MA (US); Ian Mclaughlin, Groton, MA (US); Steven Cardinali, Tewksbury, MA (US); Alexander Doudoumopoulos, Boxborough, MA (US)

(73) Assignee: INSULET CORPORATION, Acton, MA (US)

( * ) Notice: Subject to any disclaimer, the term of this patent is extended or adjusted under 35 U.S.C. 154(b) by 142 days.

(21) Appl. No.: 17/569,965

(22) Filed: Jan. 6, 2022

(65) Prior Publication Data

US 2022/0218898 A1 Jul. 14, 2022

Related U.S. Application Data

(60) Provisional application No. 63/136,492, filed on Jan. 12, 2021.

(51) Int. Cl.
*A61M 5/142* (2006.01)
(52) U.S. Cl.
CPC .............................. *A61M 5/14248* (2013.01)
(58) Field of Classification Search
CPC .......... A61M 2210/04; A61M 5/14248; A61M 5/14244; A61M 2025/0266; A61F 13/025; A61F 13/0246
See application file for complete search history.

(56) References Cited

U.S. PATENT DOCUMENTS

| 1,441,508 | A | | 1/1923 | Marius |
| 2,897,214 | A | | 7/1959 | Chamberlin et al. |
| 3,163,162 | A | * | 12/1964 | Basseches ........... A61F 13/0226 602/56 |
| 3,579,805 | A | | 5/1971 | Kast |
| 4,833,088 | A | | 5/1989 | Desimone et al. |
| 5,232,668 | A | | 8/1993 | Grant et al. |

(Continued)

FOREIGN PATENT DOCUMENTS

| EP | 3135965 A1 | 3/2017 |
| EP | 3000497 A1 | 1/2019 |

(Continued)

OTHER PUBLICATIONS

International Preliminary Report on Patentability for the International Patent Application No. PCT/US2019/042160, mailed Jan. 28, 2021, 12 pages.

(Continued)

*Primary Examiner* — Courtney B Fredrickson
*Assistant Examiner* — Kayla M. Turkowski
(74) *Attorney, Agent, or Firm* — GOODWIN PROCTER LLP

(57) ABSTRACT

An improved wearable drug delivery device and method for removal are provided. In some embodiments, a device may include a device body coupled to an adhesive layer, and a removal element coupled to the adhesive layer. The removal element may include an end section proximate a perimeter of the adhesive layer and a central section connected to the end section, wherein a force applied to the end section causes the central section to transition from a first configuration to a second configuration.

13 Claims, 18 Drawing Sheets

(56) References Cited

U.S. PATENT DOCUMENTS

| | | | |
|---|---|---|---|
| 5,244,459 A | 9/1993 | Hill | |
| 5,995,236 A | 11/1999 | Roth et al. | |
| 6,142,181 A | 11/2000 | Schumacher | |
| 6,200,293 B1 | 3/2001 | Kriesel et al. | |
| 6,311,933 B1* | 11/2001 | Starchevich | H02G 3/26 |
| | | | 248/65 |
| 6,418,332 B1 | 7/2002 | Mastrototaro et al. | |
| 6,514,460 B1 | 2/2003 | Fendrock | |
| 6,740,059 B2 | 5/2004 | Flaherty | |
| 6,768,425 B2 | 7/2004 | Flaherty et al. | |
| 7,137,964 B2 | 11/2006 | Flaherty | |
| 7,303,549 B2 | 12/2007 | Flaherty et al. | |
| 7,731,900 B2 | 6/2010 | Haar et al. | |
| 7,842,241 B2 | 11/2010 | Arbogast et al. | |
| 7,846,385 B2 | 12/2010 | Arbogast et al. | |
| 7,846,386 B2 | 12/2010 | Arbogast et al. | |
| 7,846,387 B2 | 12/2010 | Arbogast et al. | |
| 7,846,388 B2 | 12/2010 | Arbogast et al. | |
| 7,867,446 B2 | 1/2011 | Arbogast et al. | |
| 7,897,107 B2 | 3/2011 | Arbogast et al. | |
| 7,914,742 B2 | 3/2011 | Arbogast et al. | |
| 8,003,052 B2 | 8/2011 | Sacherer | |
| 8,080,205 B2 | 12/2011 | Arbogast et al. | |
| 8,431,408 B2 | 4/2013 | Lewis et al. | |
| 8,465,977 B2 | 6/2013 | Joseph et al. | |
| 8,701,264 B2 | 4/2014 | Martinson | |
| 8,765,482 B2 | 7/2014 | Joseph et al. | |
| 8,894,262 B2 | 11/2014 | Celentano et al. | |
| 9,265,877 B2 | 2/2016 | Mcarthur | |
| 9,572,926 B2 | 2/2017 | Cabiri | |
| 9,814,832 B2 | 11/2017 | Agard et al. | |
| RE47,100 E | 10/2018 | Smith et al. | |
| 10,661,012 B2 | 5/2020 | Nazzaro et al. | |
| 11,472,156 B2* | 10/2022 | Lehmann | B32B 27/10 |
| 2004/0086710 A1* | 5/2004 | Pitzen | A47G 1/175 |
| | | | 248/205.3 |
| 2004/0116847 A1 | 6/2004 | Wall | |
| 2005/0009126 A1 | 1/2005 | Andrews et al. | |
| 2005/0125162 A1 | 6/2005 | Hajizadeh et al. | |
| 2005/0201897 A1 | 9/2005 | Zimmer et al. | |
| 2005/0232815 A1 | 10/2005 | Ruhl et al. | |
| 2005/0238507 A1 | 10/2005 | Dilanni et al. | |
| 2005/0277164 A1 | 12/2005 | Drucker et al. | |
| 2006/0211970 A1* | 9/2006 | Sciulli | A61F 13/0269 |
| | | | 602/41 |
| 2009/0204078 A1 | 8/2009 | Mitchell et al. | |
| 2009/0254041 A1 | 10/2009 | Krag et al. | |
| 2009/0282947 A1 | 11/2009 | Powell | |
| 2010/0152658 A1 | 6/2010 | Hanson et al. | |
| 2010/0168683 A1 | 7/2010 | Cabiri | |
| 2010/0317951 A1 | 12/2010 | Rutkowski et al. | |
| 2011/0071765 A1 | 3/2011 | Yodfat et al. | |
| 2011/0193704 A1 | 8/2011 | Harper et al. | |
| 2011/0218495 A1 | 9/2011 | Remde | |
| 2011/0289497 A1 | 11/2011 | Kiaie et al. | |
| 2012/0095316 A1 | 4/2012 | Lewis et al. | |
| 2012/0201048 A1 | 8/2012 | Prais | |
| 2013/0075027 A1* | 3/2013 | Sheridan | B32B 27/00 |
| | | | 428/40.7 |
| 2013/0204130 A1 | 8/2013 | Mcarthur et al. | |
| 2014/0012119 A1 | 1/2014 | Geaghan et al. | |
| 2014/0054883 A1 | 2/2014 | Lanigan et al. | |
| 2014/0074033 A1 | 3/2014 | Sonderegger et al. | |
| 2014/0078263 A1 | 3/2014 | Kim | |
| 2014/0131199 A1 | 5/2014 | Simmons et al. | |
| 2014/0148784 A1 | 5/2014 | Anderson et al. | |
| 2014/0254170 A1 | 9/2014 | Celentano et al. | |
| 2014/0296787 A1 | 10/2014 | Agard et al. | |
| 2014/0316379 A1 | 10/2014 | Sonderegger et al. | |
| 2015/0283335 A1 | 10/2015 | Lin | |
| 2015/0338349 A1 | 11/2015 | Carter et al. | |
| 2015/0361154 A1 | 12/2015 | Jowett et al. | |
| 2015/0366945 A1 | 12/2015 | Greene | |
| 2016/0015891 A1 | 1/2016 | Papiorek | |
| 2016/0038689 A1 | 2/2016 | Lee et al. | |
| 2016/0058941 A1 | 3/2016 | Wu et al. | |
| 2016/0135747 A1 | 5/2016 | Frey et al. | |
| 2016/0310665 A1 | 10/2016 | Hwang et al. | |
| 2017/0028132 A1 | 2/2017 | Cronenberg et al. | |
| 2017/0106138 A1 | 4/2017 | Cabiri | |
| 2017/0189270 A1 | 7/2017 | Nazzaro et al. | |
| 2017/0214584 A1 | 7/2017 | Kanojia et al. | |
| 2017/0234858 A1 | 8/2017 | Depa et al. | |
| 2017/0348479 A1 | 12/2017 | Choate et al. | |
| 2017/0354785 A1 | 12/2017 | Gazeley et al. | |
| 2018/0015274 A1 | 1/2018 | Haury et al. | |
| 2018/0075200 A1 | 3/2018 | Davis et al. | |
| 2018/0207357 A1 | 7/2018 | John | |
| 2018/0236173 A1 | 8/2018 | Mccaffrey et al. | |
| 2018/0256815 A1 | 9/2018 | Nazzaro | |
| 2018/0307515 A1 | 10/2018 | Meller et al. | |
| 2019/0022317 A1 | 1/2019 | Uddin et al. | |
| 2019/0091404 A1 | 3/2019 | Nazzaro et al. | |
| 2019/0132801 A1 | 5/2019 | Kamath et al. | |
| 2019/0167895 A1 | 6/2019 | Dechellette et al. | |
| 2019/0240417 A1 | 8/2019 | Hostettler et al. | |
| 2019/0321545 A1 | 10/2019 | Saint | |
| 2020/0197605 A1 | 6/2020 | Haidar | |
| 2020/0261643 A1 | 8/2020 | Boyaval et al. | |
| 2022/0133988 A1* | 5/2022 | Garai | A61F 13/0246 |
| | | | 604/506 |
| 2023/0034952 A1* | 2/2023 | Li | C09J 7/22 |

FOREIGN PATENT DOCUMENTS

| | | |
|---|---|---|
| FR | 2096275 A5 | 2/1972 |
| GB | 357139 A | 9/1931 |
| GB | 810488 A | 3/1959 |
| JP | 2009523535 A | 6/2009 |
| JP | 2019525276 A | 9/2019 |
| WO | 2007084214 A1 | 7/2007 |
| WO | 2007092618 A2 | 8/2007 |
| WO | 2019195521 A1 | 10/2019 |
| WO | 2019213493 A1 | 11/2019 |
| WO | 2019246381 A1 | 12/2019 |
| WO | 2021011738 A1 | 1/2021 |

OTHER PUBLICATIONS

International Search Report and Written Opinion for the International Patent Application No. PCT/US2021/047695, mailed Jan. 31, 2022, 26 pages.

International Search Report and Written Opinion for the International Patent Application No. PCT/US21/064056, mailed Apr. 4, 2022, 12 pages.

Anonymous: "AndroidAPS ComponentOverview", AndroidAPS documentation, Nov. 12, 2020 (Nov. 12, 2020), pp. 1-7, Retrieved from the Internet: URL:https://github.com/openaps/AndroidAPSdocs/blob/199ef86a900adf4b3d9c32f605eb11047bd3d62f/docs/EN/Module/module.rst [retrieved on Apr. 11, 2020] the whole document.

International Search Report and Written Opinion for the International Patent Application No. PCT/US22/018700, mailed Jun. 7, 2022, 13 pages.

Legacy Med Search, Insulet Enrolls First Patients in Clinical Trial for Omnipod, Sep. 16, 2016, available at URL: https://legacymedsearch.com/insulet-enrolls-first-patients-in-clinical-trial-for-omnipod-artificial-pancreas-system/.

* cited by examiner

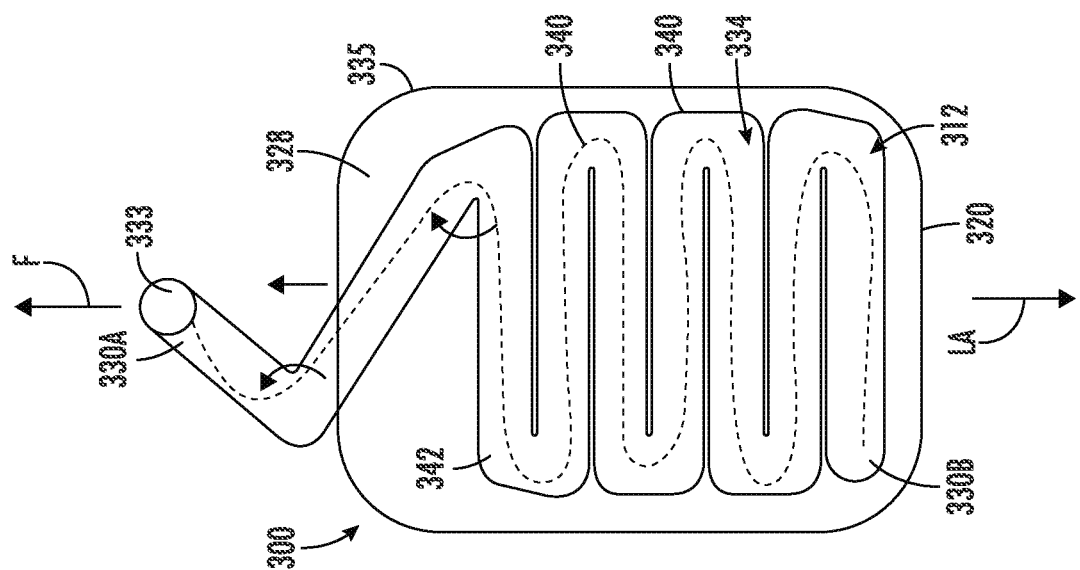
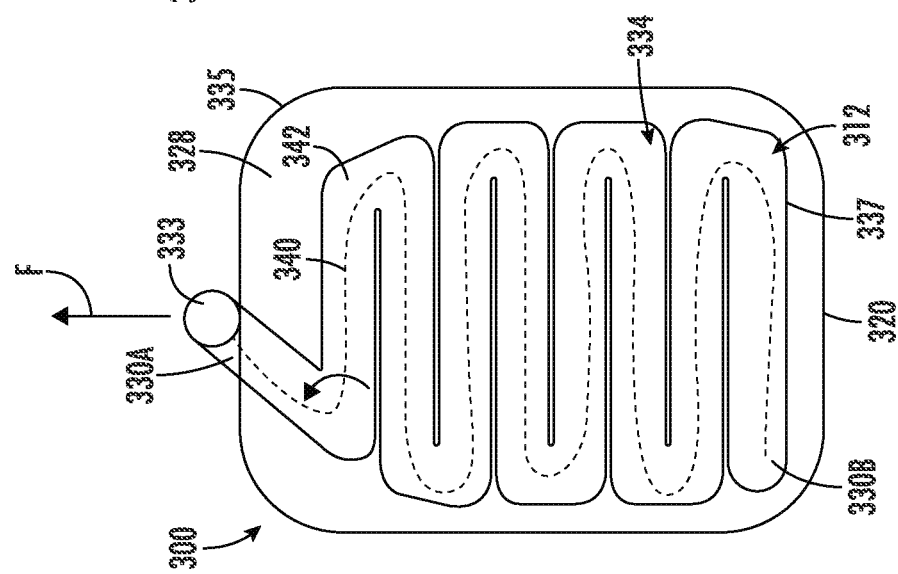
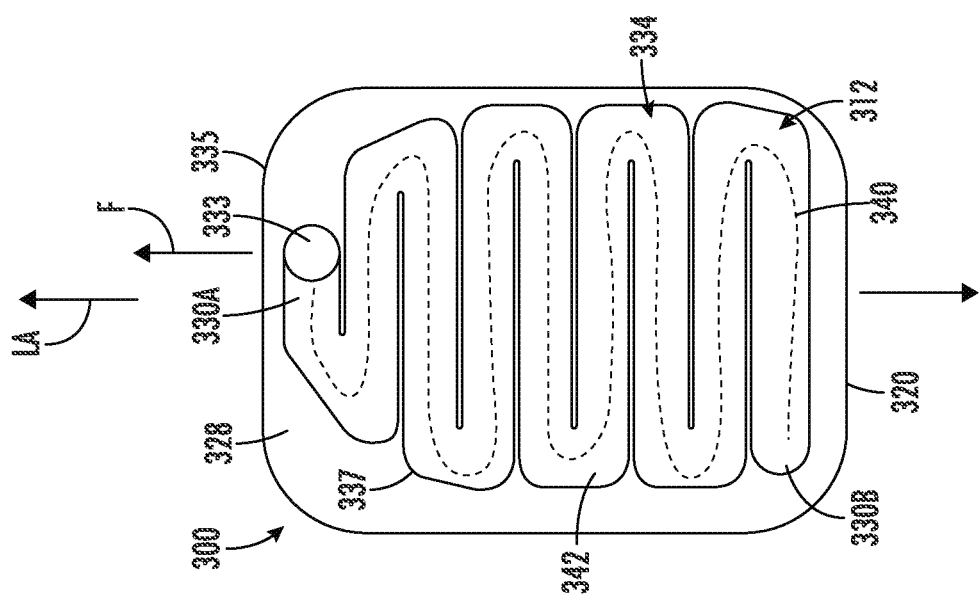

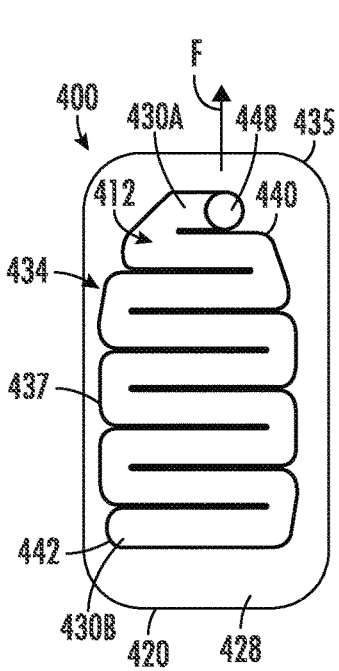
FIG. 10A
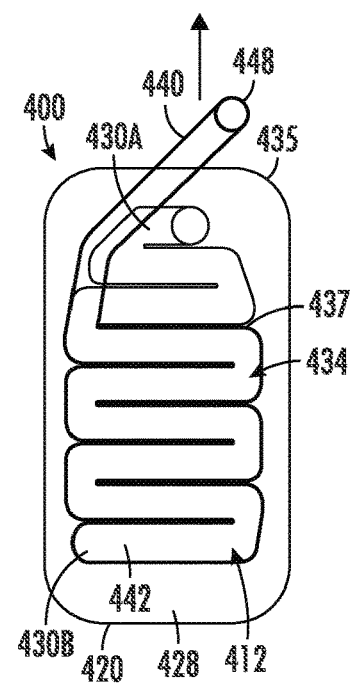
FIG. 10B
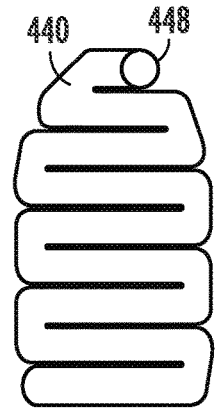
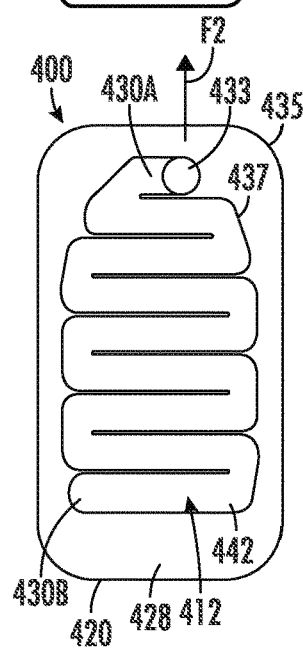
FIG. 10C
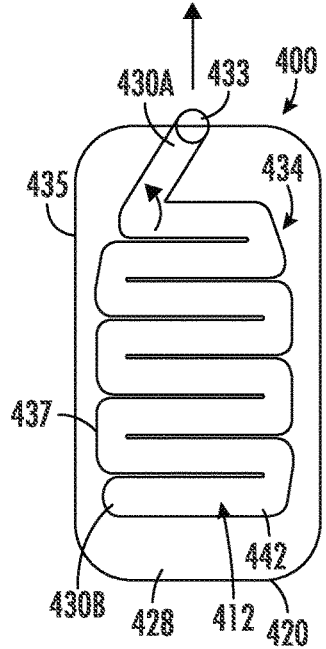
FIG. 10D
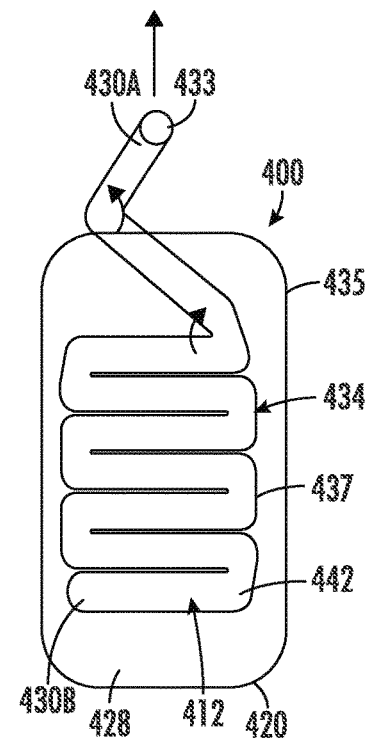
FIG. 10E

WEARABLE DRUG DELIVERY DEVICE WITH REMOVAL ELEMENT

RELATED APPLICATIONS

This application claims the benefit of U.S. Provisional Patent Application No. 63/136,492, filed Jan. 12, 2021, the contents of which are incorporated herein by reference in their entirety.

TECHNICAL FIELD

Embodiments of the present disclosure generally relate to drug delivery devices. More particularly, embodiments of the present disclosure relate to wearable drug delivery devices including a removal element.

BACKGROUND

A person may wear a medical device on his or her body for any of a variety of reasons, such as insulin injection, heart rate monitoring, or other reason. Many wearable medication delivery devices use an adhesive for attachment to the skin of the user. The trend is to use stronger, longer-wear adhesives, particularly for heavier wearable medication delivery devices. However, the adhesive may still be securely attached at the end of the required life of the wearable medication delivery device, thus resulting in irritation and skin damage when the medication delivery device is removed. A need therefore exists for improved techniques for removing wearable medical devices from users.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one approach of the disclosure, a device may include a device body coupled to an adhesive layer, and a removal element coupled to the adhesive layer. The removal element may include an end section proximate a perimeter of the adhesive layer, and a central section connected to the end section, wherein a force applied to the end section causes the central section to transition between a first configuration and a second configuration.

In another approach of the disclosure, a wearable drug delivery system may include a device body coupled to a pad, an adhesive layer coupled to the pad, and a removal element directly coupled to the adhesive layer. The removal element may include an end section proximate a perimeter of the adhesive layer for engagement by a user, and a central section connected to the end section, wherein a force applied to the end section causes the central section to transition from a first configuration to a second configuration.

In another approach of the disclosure, a method may include providing a device body coupled to an adhesive layer and coupling a removal element to the adhesive layer. The removal element may include an end section proximate a perimeter of the adhesive layer, and a central section connected to the end section. The method may further include receiving a force to the end section, wherein the force causes the central section to transition from a first configuration to a second configuration.

BRIEF DESCRIPTION OF THE DRAWINGS

In the drawings, like reference characters generally refer to the same parts throughout the different views. In the following description, various embodiments of the present disclosure are described with reference to the following drawings, in which:

FIGS. 9A-9C illustrate bottom views of a device according to embodiments of the present disclosure;

FIGS. 10A-10E illustrate bottom views of a device according to embodiments of the present disclosure;

The drawings are not necessarily to scale. The drawings are merely representations, not intended to portray specific parameters of the disclosure. The drawings are intended to depict exemplary embodiments of the disclosure, and therefore are not to be considered as limiting in scope. Furthermore, certain elements in some of the figures may be omitted, or illustrated not-to-scale, for illustrative clarity. Still furthermore, for clarity, some reference numbers may be omitted in certain drawings.

DETAILED DESCRIPTION

Systems, devices, and methods in accordance with the present disclosure will now be described more fully hereinafter with reference to the accompanying drawings, where one or more embodiments are shown. The systems, devices, and methods may be embodied in many different forms and are not to be construed as being limited to the embodiments set forth herein. Instead, these embodiments are provided so the disclosure will be thorough and complete, and will fully convey the scope of methods and devices to those skilled in the art.

Based on skin type, amount of hair, sebum secretion, etc., stronger tack adhesives are generally preferred for attaching medical devices to a skin of a wearer. Longer-wear medical device adhesives tend to build strength over the first few hours and/or first day of use, and then gradually degrade in strength over time. However, if a longer duration adhesive is employed with a shorter duration medical device, the adhesive will likely remain relatively strong at the time of medical device removal, thus causing irritation and/or skin damage to the wearer. For example, in the case of a 3-day patch pump, an adhesive designed for 10+ days of use may be employed due to the added mass and expected activity level of the user. At the end of the 3-day period, the patch pump may need to be removed despite the adhesive still being strong. One alternative is a less aggressive adhesive, which may be more prone to lose necessary strength before the end of the required life of the product. Embodiments herein combine stronger and longer-wear medical device adhesives with a removal device, which makes it easier to remove the medical device, resulting in less pain and irritation to the wearer.

In some embodiments, the removal element may be a cord, string, rope, or wire-like element that is secured to an adhesive surface along the bottom of the medication delivery device. When the wearable medication delivery device is secured to the wearer, one or more sections of the removal element may be exposed or exposable and thereby accessible to a user, such as for grabbing by the user's fingers or engaging with a tool, such as a paper clip or other element. To subsequently remove the wearable medication delivery device, the exposed section(s) of the removal element may be engaged (e.g., pulled), which causes the removal element to move along the adhesive surface, thus shearing a connection between the adhesive and the wearer's skin.

Figure 1:
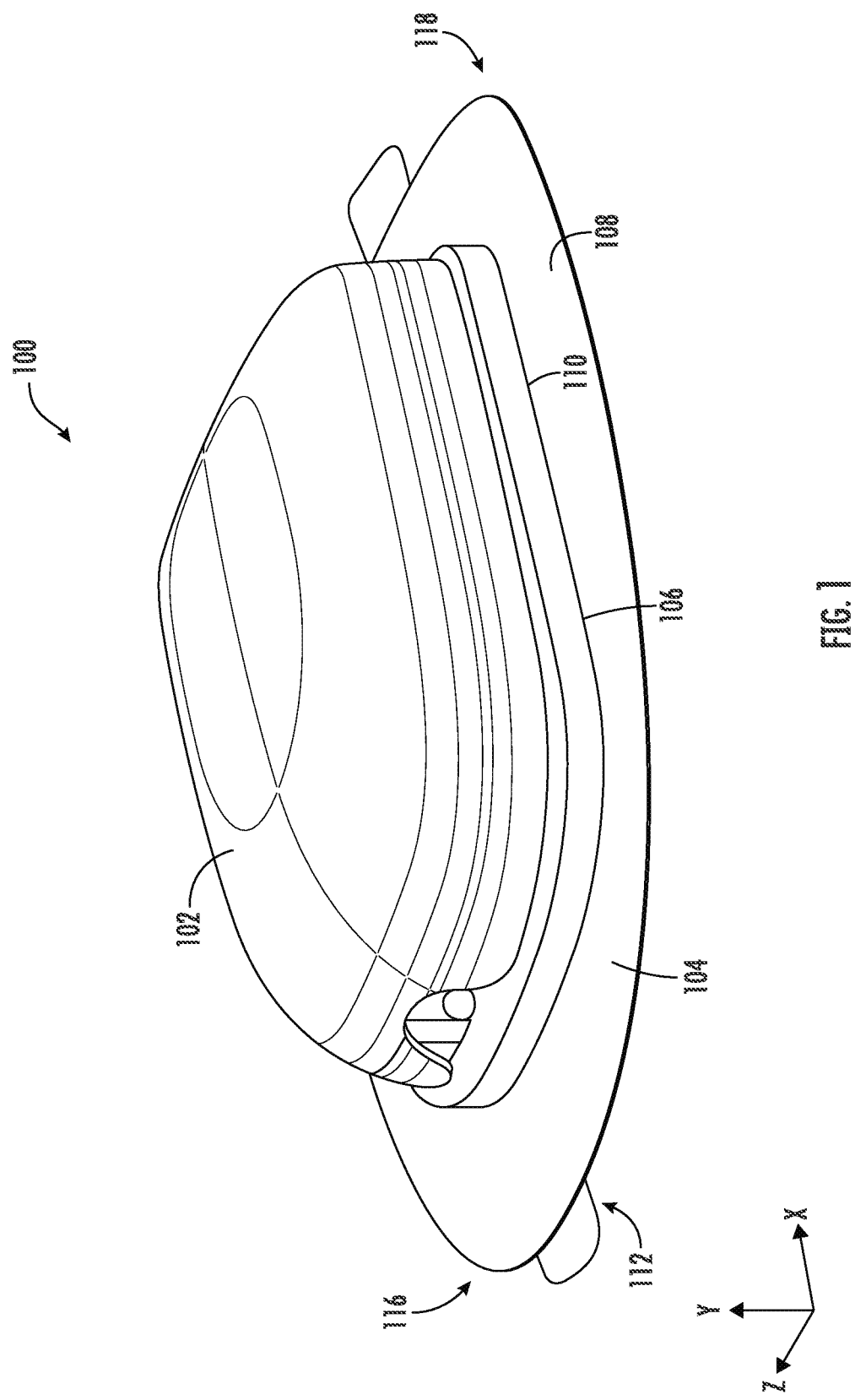
FIG. 1 illustrates a perspective view of a device according to embodiments of the present disclosure.
Figure 2:
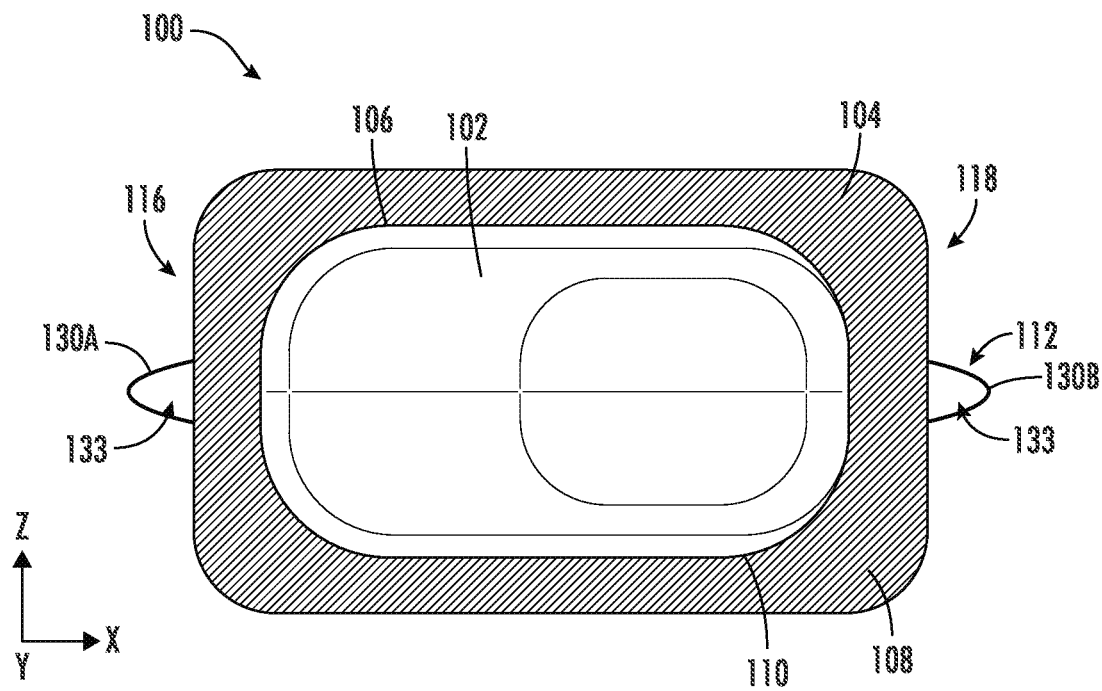
FIG. 2 illustrates a top view of the device depicted in FIG. 1 according to embodiments of the present disclosure.

FIGS. 1-2 illustrate a wearable medication delivery system/device (hereinafter "device") 100 according to non-limiting embodiments of the present disclosure. The device 100 may include a device body 102 coupleable to a wearer by an adhesive carrier or pad 104, wherein the pad 104 may be coupled or attached to a bottom surface of a base 106 of the device body 102. As will be described in greater detail herein, the pad 104 may include an adhesive layer attached to a bottom or underside thereof. The adhesive layer of the pad 104 can be used to attach the device body 102 to the skin of the wearer. Although not limited to any particular shape or size, the pad 104 can have a shape that is larger than the device body 102. That is, an outer portion 108 of the pad 104 can extend beyond an outer perimeter or profile 110 of the base 106 of the device body 102. Extending beyond the outer portion 108 of the pad 104 may be one or more removal elements 112, which can be engaged by the wearer or other individual to aid with removal of the device 100. As will be described in greater detail herein, the removal element(s) 112 may be secured to the device 100, for example, between the adhesive layer of the pad 104 and the skin of the wearer. In various embodiments, the removal elements 112 may extend from a first end 116 and/or a second end 118 of the pad 104. For example, the removal element 112 may include respective end sections 130A-130B each configured as a loop with a central opening 133. Embodiments herein are not limited in this context, however.

The device 100 can be any drug delivery device for providing any drug or medicine to a patient or user. In various embodiments, the device 100 may be a disposable drug delivery device intended for limited use. In various embodiments, the device 100 can be an insulin delivery device. The device 100 can be intended for use over a few days (e.g., approximately 3 days and/or approximately 80 hours), or for an extended length of time. In various embodiments, the device 100 can be an OMNIPOD® (Insulet Corporation, Acton, Mass.) insulin delivery device.

The device 100 may include a number of components to facilitate delivery of a medication to the user. Although not shown, the device 100 may include a reservoir for storing the medication, a needle or cannula for delivering the medication through the skin of the wearer, and a pump for transferring the medication from the reservoir, through the needle or cannula. The device 100 may also include a power source, such as a battery, for supplying power to the pump and/or other components of the device 100. In some embodiments, the device 100 may also contain analog and/or digital circuitry for controlling the delivery of the medication. The circuitry may be implemented as a controller. The circuitry may include discrete, specialized logic and/or components, an application-specific integrated circuit, a microcontroller or processor that executes software instructions, firmware, or any combination thereof. In various embodiments, the control circuitry may be configured to cause the pump to deliver doses of the medication to the person at predetermined intervals. The size and/or timing of the doses may be programmed into the control circuitry using a wired or wireless link by the user or by a third party, such as a health care provider.

Instructions for determining the delivery of the medication to the user (e.g., the size and/or timing of any doses of the medication) may originate locally (e.g., based on determinations made by the device 100) or may originate remotely, which are then provided to the device 100. Remote instructions may be provided to the device 100 over a wired or wireless link. The device 100 may execute any received instructions for the delivery of the medication to the user. In this way, under either scenario, the delivery of the medication to the user may be automated.

Figure 3A:
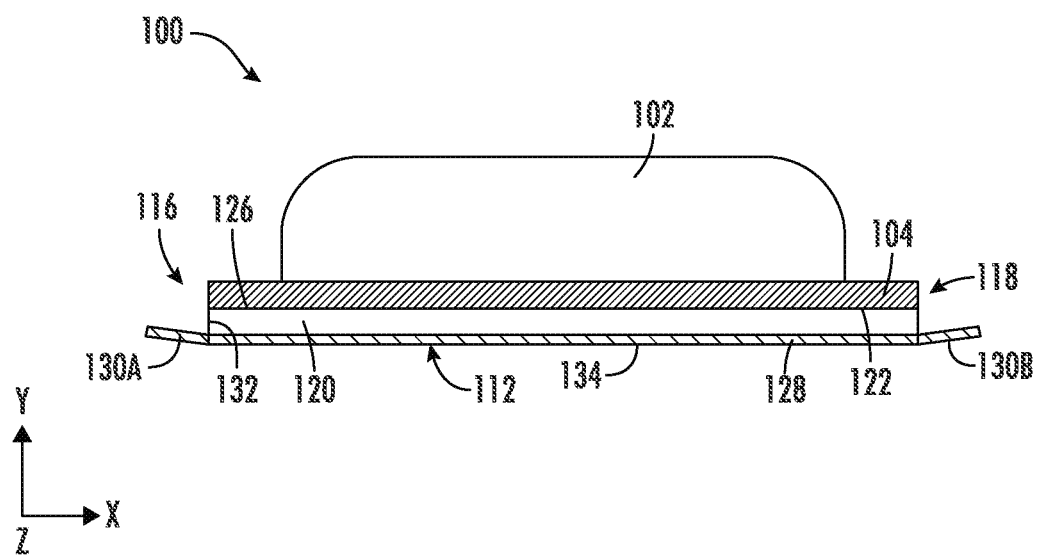
FIG. 3A illustrates a side view of the device depicted in FIG. 1 according to embodiments of the present disclosure.

Turning now to FIG. 3A, the device 100 according to embodiments of the present disclosure will be described in greater detail. As shown, an adhesive layer 120 may be coupled to a bottom surface 122 of the pad 104. The adhesive layer 120 may generally have a same or similar shape as the pad 104. As shown, the adhesive layer 120 may extend between the first end 116 and the second end 118 of the pad 104. In other embodiments, the adhesive layer 120 may be sized and/or shaped differently from the pad 104. The adhesive layer 120 may include an interior surface 126 opposite an exterior surface 128, wherein the exterior surface 128 may be secured to the wearer's skin.

It will be appreciated that the design of the adhesive layer 120 can be selected as desired for a particular application. For example, adhesive formulations may be tailored based on wear time, strength required, initial tack, surface contact, activity level, environment, etc. The thickness of the adhesive layer 120 may be adjusted based on conformability, stability and residue left on body, etc. In some embodiments, the adhesive layer 120 can be made of any biocompatible material with biocompatible adhesive operable to hold the weight of the device 100 to the skin for a predetermined duration.

In one example, the adhesive layer 120 may provide ventilation and circulation between the adhesive layer 120 and the skin. In another example, the adhesive layer 120 is a continuous sheet of adhesive material. In yet another example, the adhesive layer 120 is a mesh sheet of adhesive material including perforations. In yet another example, the adhesive layer 120 is a continuous sheet of adhesive material with holes cut into the continuous sheet. The holes can align with features of the device body 102, as desired. In yet another example, the adhesive layer 120 is a continuous sheet of adhesive material with holes cut into the continuous sheet, and mesh applied across the holes. In yet another example, the adhesive layer 120 and the pad 104 can be made of a transparent material to allow the condition of the skin around and below the device 100 to be monitored. In one example, the adhesive layer 120 may be constructed of a pressure sensitive acrylic-based adhesive with a woven or non-woven polyester backing. Alternatively, the adhesive layer 120 may be constructed from silicone, a synthetic rubber, hydrocolloid, or hydrogel. In yet another example, the adhesive layer 120 can be made of the same or different material as the pad 104. In yet another example, the adhesive layer 120 can be made of a clear plastic film such as, for example, polyethylene. In yet another example, the adhesive layer 120 can be flexible and/or stretchable.

In various embodiments, the adhesive layer 120 can be stronger or weaker than the adhesive used on the bottom surface of the pad 104 (e.g., in terms of tensile stress required to remove the adhesive from a surface). Variable adhesive strengths of the adhesive layer 120 and the pad 104 may be desired by different users depending on user preferences (e.g., such as level of exercise, living in warmer climates, etc.).

As further shown, secured to the exterior surface 128 of the adhesive layer 120 may be the removal element 112. In some embodiments, the removal element 112 may include end sections 130A, 130B extending beyond a perimeter 132 of the adhesive layer 120, and a central section 134 connected to the end sections 130A, 130B. As shown, the central section 134 may correspond to a portion or portions of the removal element 112 positioned within a footprint defined by the perimeter 132 of the adhesive layer 120. In some embodiments, the end sections 130A, 130B of the removal element 112 may be configured as loops, which extend away from the skin of the wearer, e.g., in the y-direction, to make it easier for the wearer or medical professional to engage, either manually or with the aid of a tool. In other embodiments, the end sections 130A-130B of the removal element 112 may lay generally flat along the skin of the wearer. Although shown as generally being symmetrical, end section 130A may be sized and/or configured differently than end section 130B.

Although not shown, the exterior surface 128 of the adhesive layer 120 and the central section 134 of the removal element 112 may be covered with a release liner prior to use. For example, the release liner can protect the adhesive material and the removal element 112 along the exterior surface 128 of the adhesive layer 120 until installation/attachment of the device 100 to the skin of the wearer.

Figure 3B:
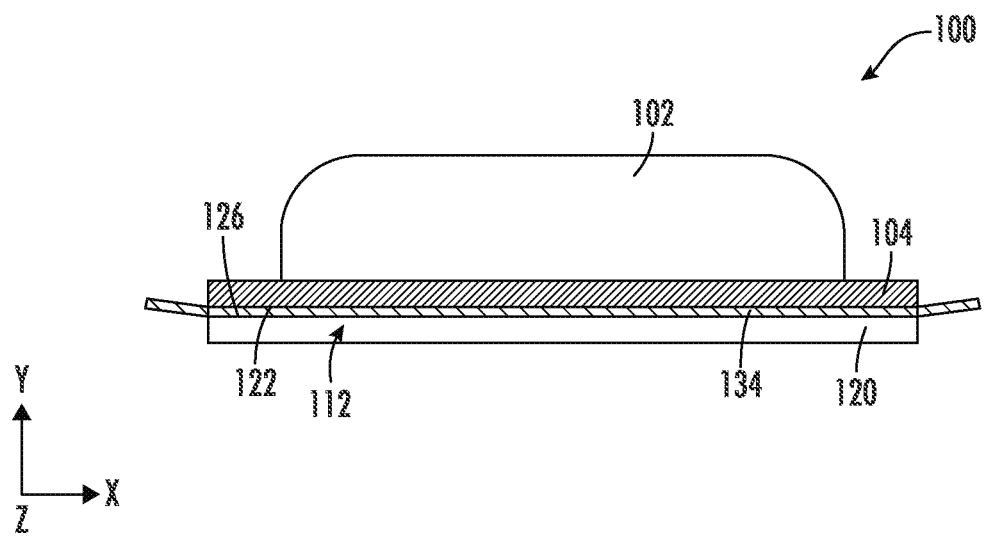
FIG. 3B illustrates a side view of a device according to embodiments of the present disclosure.

In an alternative embodiment, shown in FIG. 3B, the removal element 112 may be sandwiched between the adhesive layer 120 and the pad 104. That is, the central section 134 of the removal element 112 may be in direct physical contact with the interior surface 126 of the adhesive layer 120 and the bottom surface 122 of the pad 104. During use, the removal element 112 may be engaged (e.g., pulled) manually, or with the aid of a tool, to break the attachment between the adhesive layer 120 and the pad 104. The device body 102 and the pad 104 can then be removed from the wearer. With full access now provided, the wearer may then remove the adhesive layer 120, for example, by rolling or tearing the adhesive layer 120 away from the skin of the wearer.

Figure 3C:
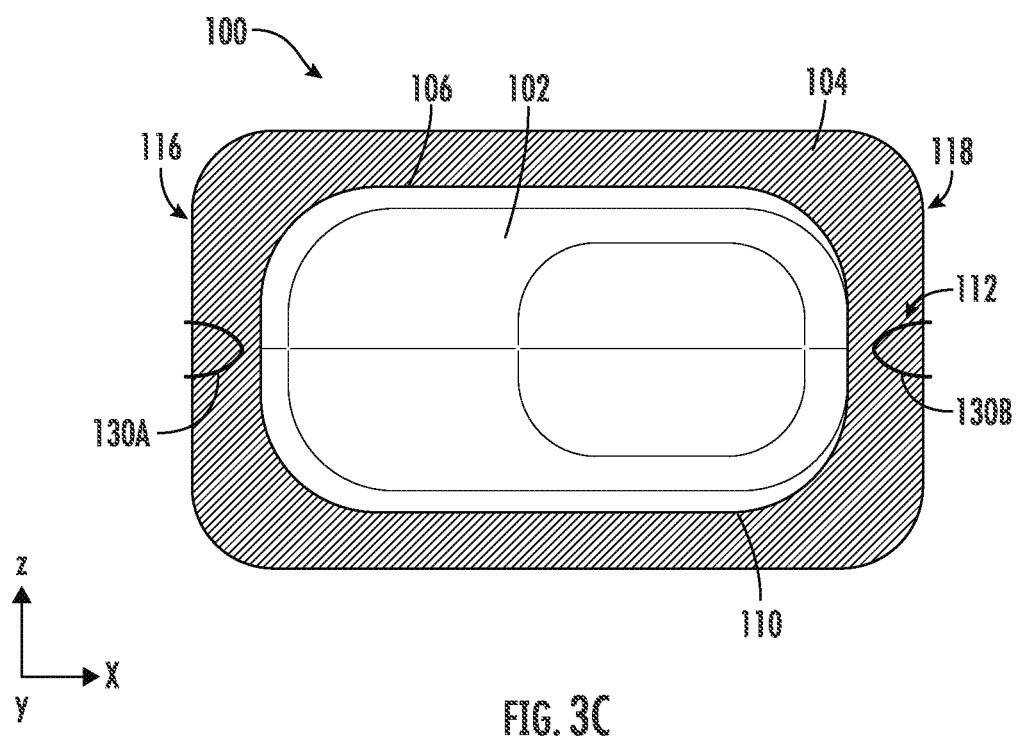
FIG. 3C illustrates a top view of a device according to embodiments of the present disclosure.
Figure 3D:
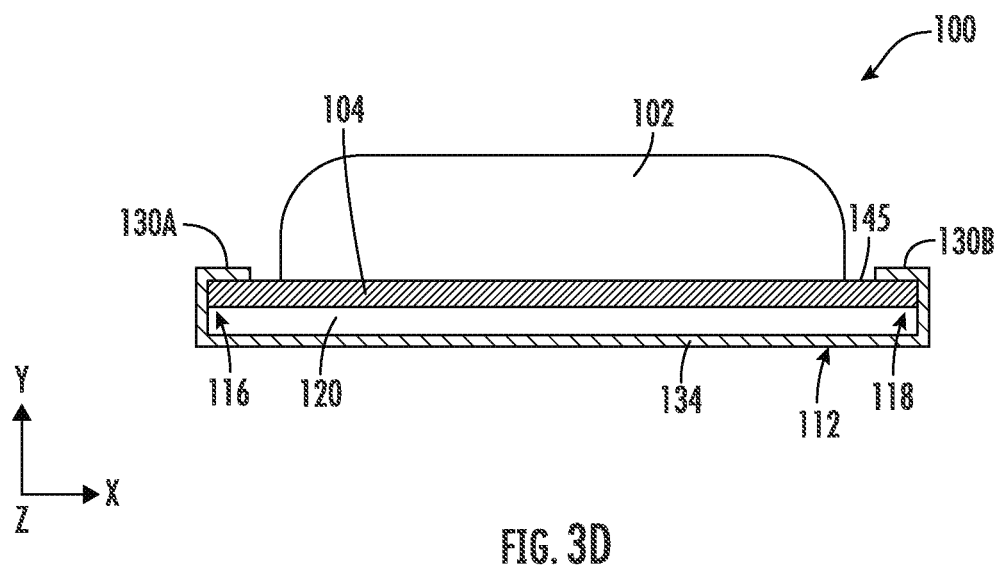
FIG. 3D illustrates a side view of the device depicted in FIG. 3C according to embodiments of the present disclosure.

In some embodiments, as shown in FIGS. 3C-3D, the end sections 130A, 130B of the removal element 112 may wrap around respective first and second ends 116, 118 of the pad 104. As shown, the end sections 130A, 130B may extend along an outer surface 145 of the pad 104. In some embodiments, the end sections 130A, 130B may be recessed within a groove (not shown) of the pad 104, and can be detached from the outer surface 145 of the pad 104 for engaging/pulling by the user, e.g., at the end of the required life of the device 100. Although non-limiting, the end sections 130A, 130B of the removal element 112 may be secured to the pad 104 by an adhesive.

Figure 3E:
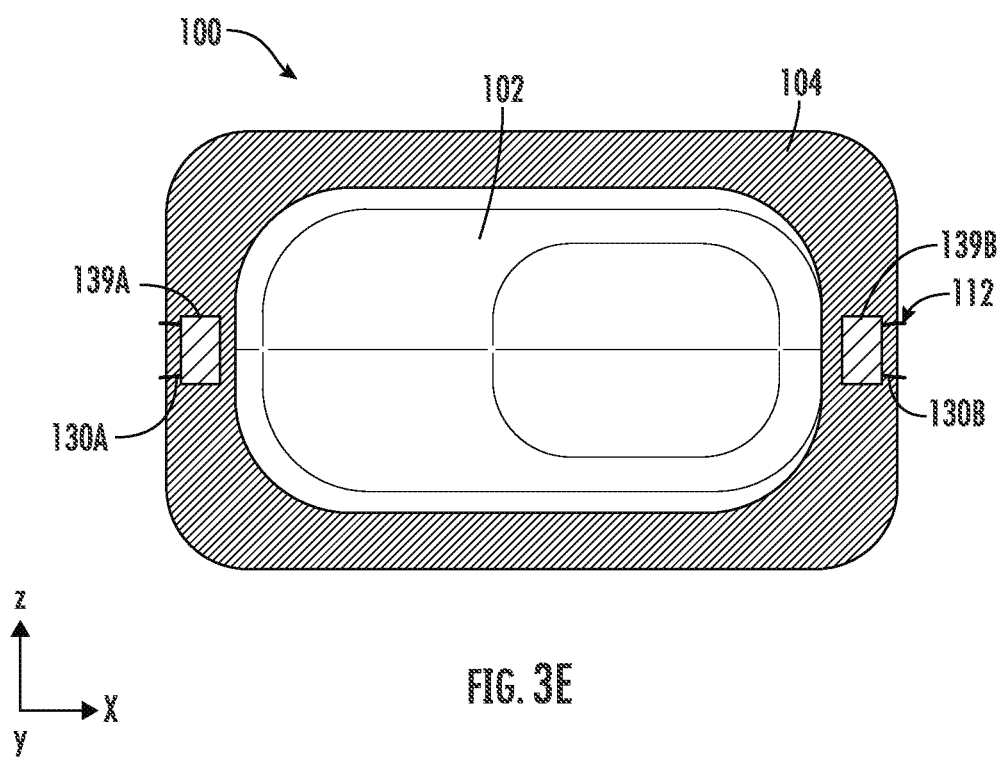
FIG. 3E illustrates a top view of a device according to embodiments of the present disclosure.
Figure 3F:
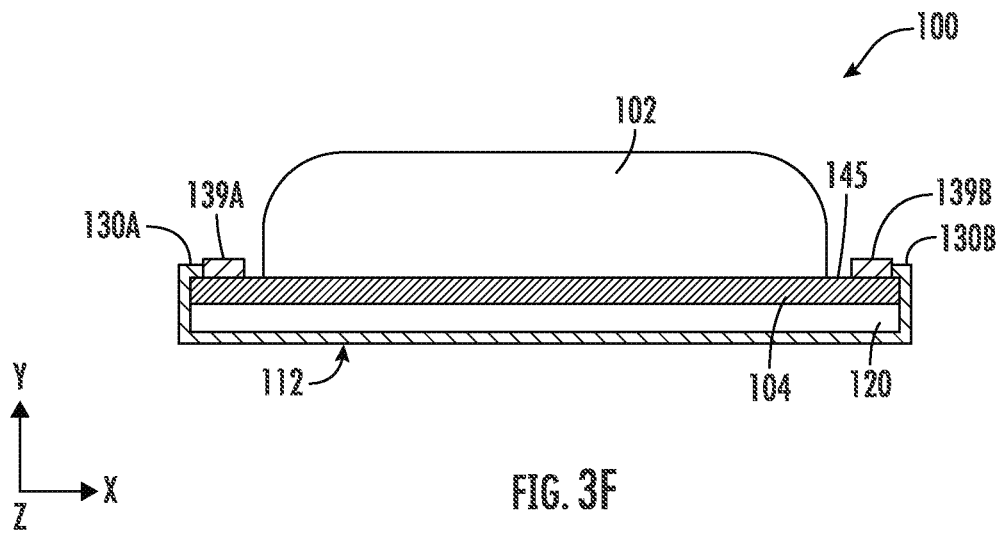
FIG. 3F illustrates a side view of the device depicted in FIG. 3E according to embodiments of the present disclosure.

In yet other embodiments, as shown in FIGS. 3E-3F, the end sections 130A, 130B of the removal element 112 may be coupled to respective pull tabs 139A, 139B. The pull tabs 139A, 139B may be a portion of the pad 104 or an additional component secured to the outer surface 145 of the pad 104, e.g., by an adhesive. The pull tabs 139A, 139B may have one or more edges or features engageable by the user.

Figure 4A:
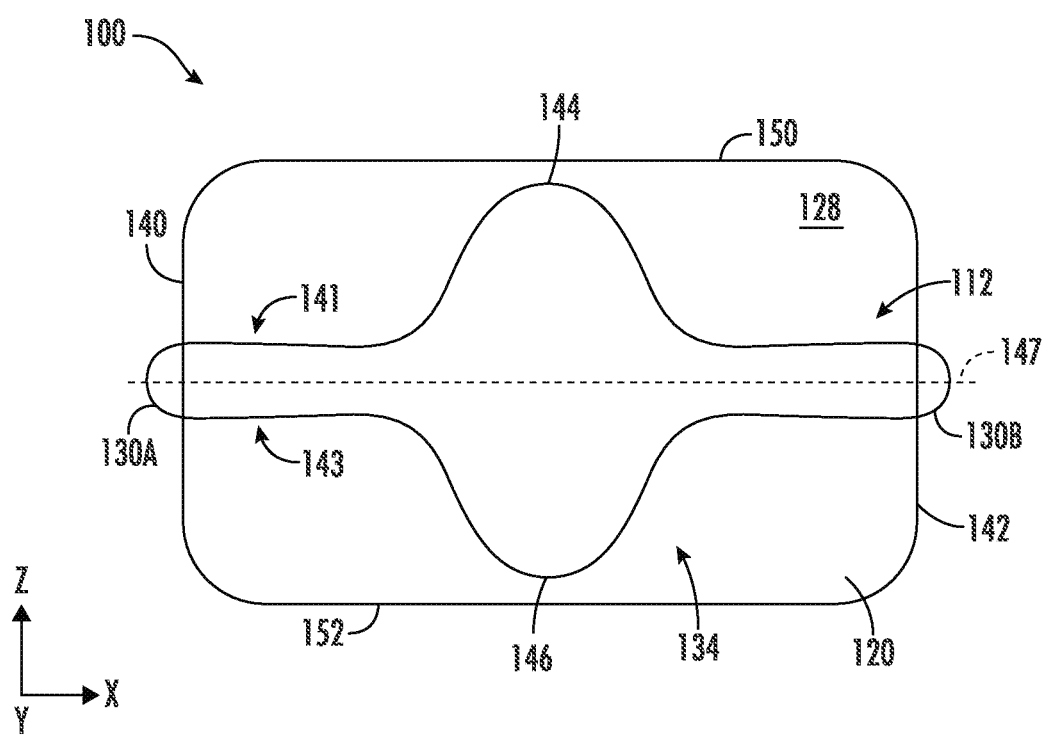
FIGS. 4A-4B illustrates bottom views of the device depicted in FIG. 1 according to one embodiment of the present disclosure.
Figure 4B:
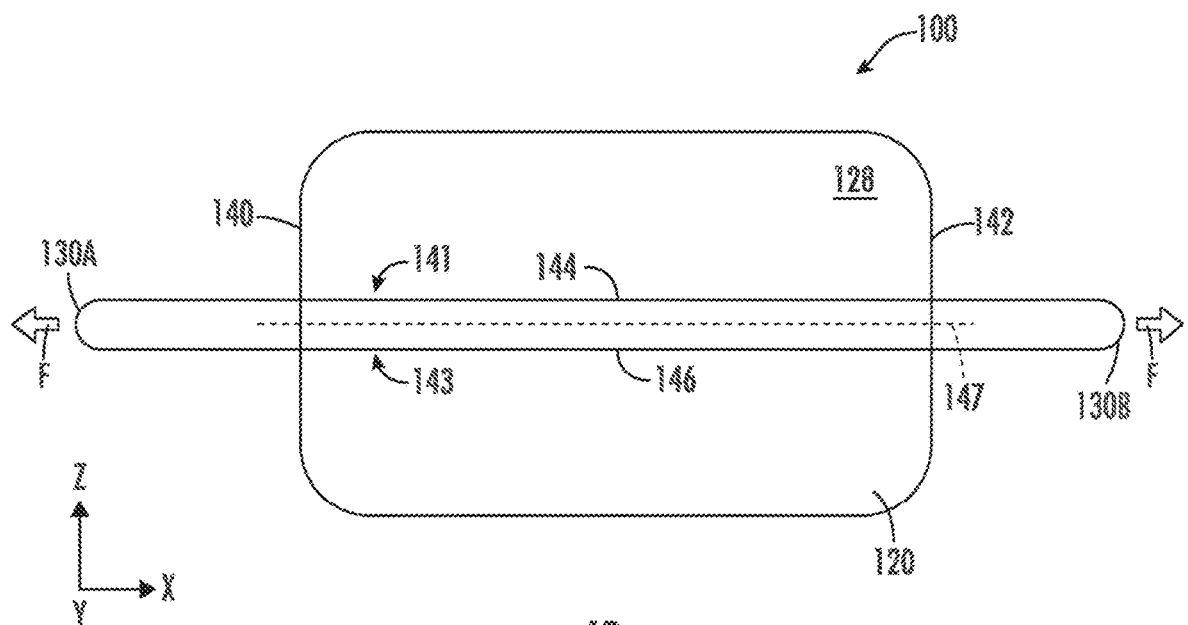

Turning now to FIGS. 4A-4B, a bottom view of the device 100 according to embodiments of the present disclosure will be described. As shown, the removal element 112 is arranged along the exterior surface 128 of the adhesive layer 120. In this embodiment, the removal element 112 may be a continuous/closed loop of material, such as a metal, a polymer, or a nylon string. For example, the removal element may be a wire element laminated onto the exterior surface 128 of the adhesive layer 120. Although not limited to any particular size or thickness, the wire element may maintain a small cross-sectional area/diameter commensurate with a thickness of the adhesive layer 120, e.g., on the order of 0.001-0.002" in diameter. The wire element may be stainless steel, which is inert, non-corrosive, high-strength, and typically does not pose allergy concerns when worn on body. Other materials for the removal element 112 may include nylon, polyethylene, and polyester. In some embodiments, the removal element 112 may include one or more flexible strands cabled or woven together.

As shown, the end section 130A may extend beyond a first end 140 of the adhesive layer 120, while the end section 130B may extend beyond a second end 142 of the adhesive layer 120. In the configuration of FIG. 4A, the central section 134 of the removal element 112 may include a first path 141 including a first peak 144 extending towards a first side 150 of the adhesive layer 120, and a second path 143 including a second peak 146 extending towards a second side 152 of the adhesive layer 120. The first and second paths 141, 143 of the removal element 112 may be symmetrically or asymmetrically arranged about a lengthwise axis 147 in various embodiments.

When the device 100 is to be removed from the skin of the wearer, the removal element 112 may be engaged to cause the removal element 112 to transition from the first configuration shown in FIG. 4A to a second configuration shown in FIG. 4B. In one embodiment, the end sections 130A, 130B may move laterally in opposite directions, e.g., along the lengthwise axis 147, in response to a force 'F'. As the end sections 130A, 130B move away from respective first and second ends 140, 142 of the adhesive layer 120, the resultant pulling forces transmit force vectors on the first and second peaks 144, 146 of the central section 134, thus causing the first and second peaks 144, 146 to move towards the lengthwise axis 147, e.g., until relatively flat. As a result, the first and second paths 141, 143 of the removal element 112 shear an adhesive connection between the exterior surface 128 of the adhesive layer 120 and the skin of the wearer as the first and second paths 141, 143 move towards one another. The first and second paths 141, 143 may extend substantially parallel to one another when the end sections 130A, 130B are fully separated from one another. The first and second paths 141, 143 may also be substantially perpendicular with the lengthwise axis 147, as shown. Once the removal element 112 is brought into the second configuration, end section 130A or end section 130 may be pulled (e.g., in the z-direction and/or the y-direction) to further disrupt any remaining adhesive connection at an interface of the exterior surface 128 of the adhesive layer 120 and the skin of the wearer, resulting in easier removal of the device 100.

Figure 5A:
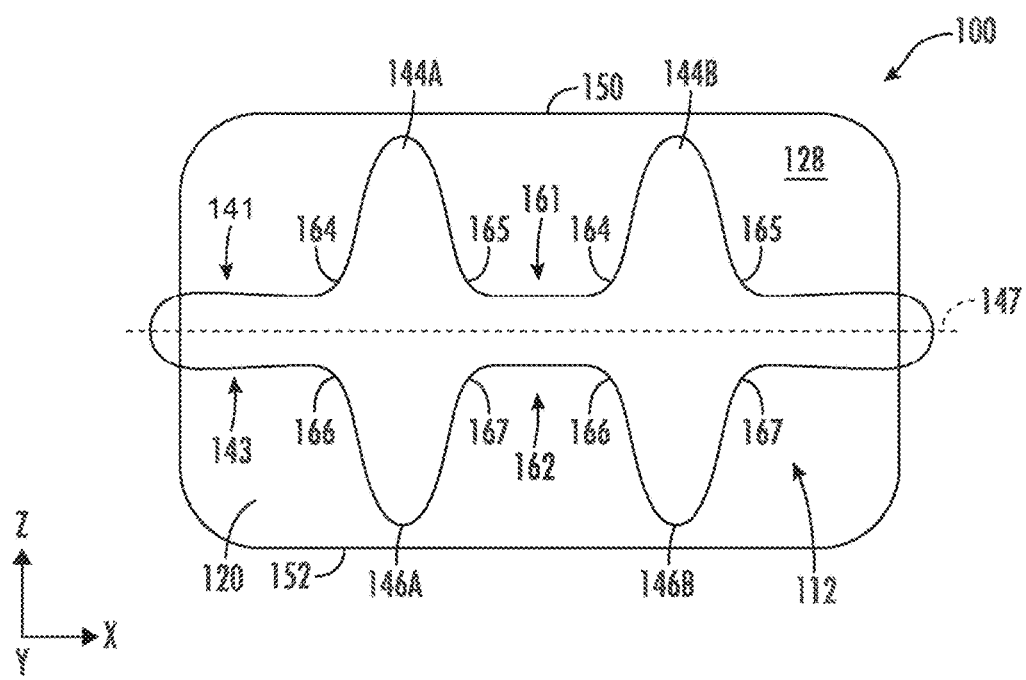
FIGS. 5A-5C illustrates bottom views of the device depicted in FIG. 1 according to various embodiments of the present disclosure.
Figure 5B:
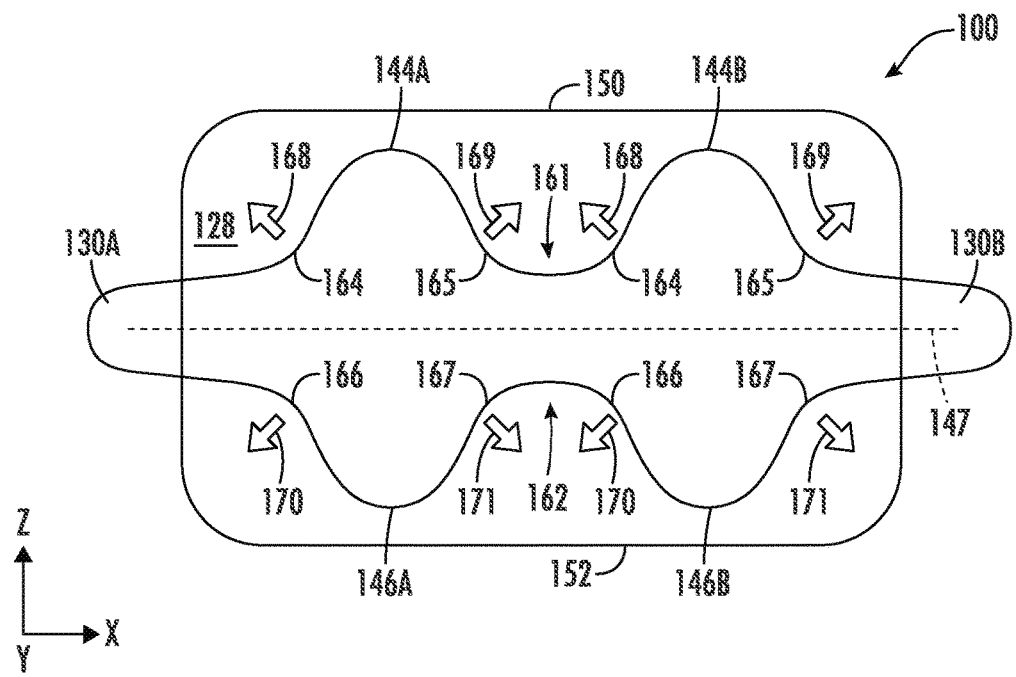

Turning now to FIGS. 5A-5B, a bottom view of the device 100 according to another embodiment of the present disclosure will be described. In the first configuration of FIG. 5A, the first path 141 of the removal element 112 may include a first plurality of peaks 144A and 144B, and the second path 143 of the removal element 112 may include a second plurality of peaks 146A and 146B. The first path 141 may further define a first valley 161 between peaks 144A and 144B, and the second path 143 may define a second valley 162 between peaks 146A and 146B. As shown, the first plurality of peaks 144A, 144B extend towards the first side 150 of the adhesive layer 120, while the first valley 161 extends towards the lengthwise axis 147. Similarly, the second plurality of peaks 146A, 146B extend towards the second side 152 of the adhesive layer 120, while the second valley 162 extends towards the lengthwise axis 147. The first and second paths 141, 143 of the removal element 112 may be symmetrically or asymmetrically arranged about the lengthwise axis 147 in various embodiments. Furthermore, it will be appreciated that a greater or lesser number of peaks and valleys is possible in alternative embodiments. For example, additional peaks and valleys may be added to the first and/or second paths 141, 143 to maximize the number of force vectors present, which reduces the amount of force a user would need to exert on the end sections 130A, 130B to cause release of the adhesive layer 120.

As further shown, each of the first plurality of peaks 144A, 144B may include a first base corner 164 and a second base corner 165. Similarly, each of the second plurality of peaks 146A, 146B may include a first base corner 166 and a second base corner 167. When the device 100 is to be removed from the skin of the wearer, the end sections 130A, 130 of the removal element 112 may be engaged to cause the removal element 112 to begin transitioning from the first configuration shown in FIG. 5A to an intermediate configuration shown in FIG. 5B. In the intermediate configuration, the end sections 130A, 130B may be pulled laterally in opposite directions, e.g., along the lengthwise axis 147, which causes the first plurality of peaks 144A, 144B and the second plurality of peaks 146A, 146B to begin moving away from respective first and second sides 150, 152 and towards the lengthwise axis 147. Meanwhile, the first base corner 164 and the second base corner 165 of the first path 141 may begin moving away from the lengthwise axis 147, e.g., in directions shown by arrows 168 and 169, respectively. Similarly, the first base corner 166 and the second base corner 167 of the second path 143 may also begin moving away from the lengthwise axis 147, e.g., in directions shown by arrows 170 and 171, respectively. As a result of the movement of the first plurality of peaks 144A and 144B and the second plurality of peaks 146A and 146B, respective valleys 161, 162 may become shallower.

Figure 5C:
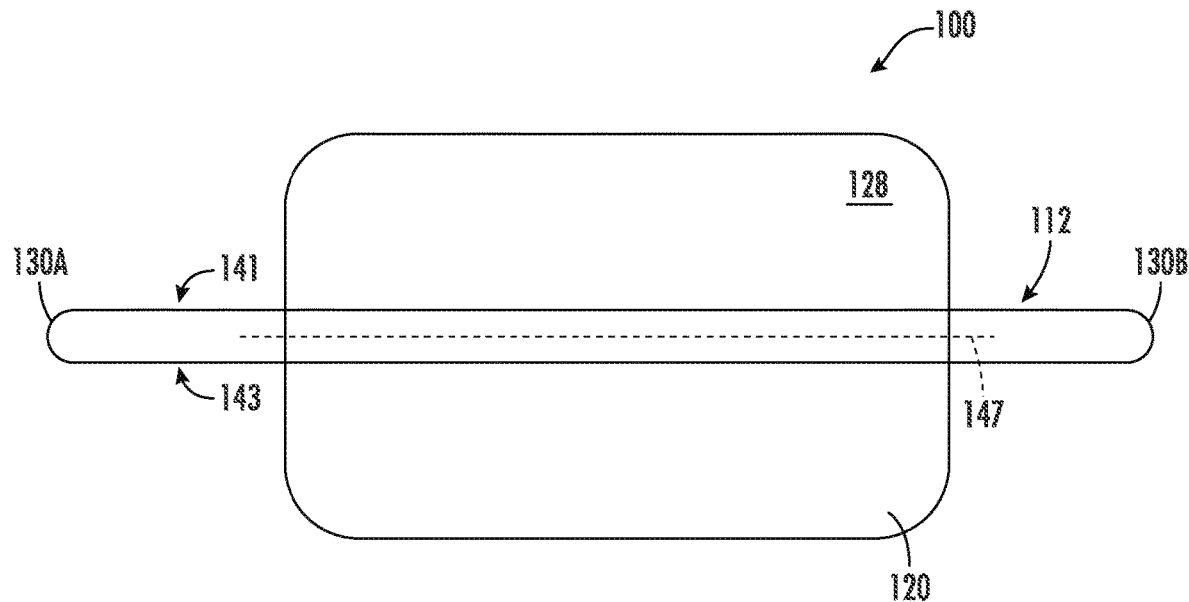

As shown in FIG. 5C, the end sections 130A, 130B may be fully separated from one another when the removal element 112 is in the second configuration. Movement of the first and second paths 141, 143 of the removal element 112 between first and second configurations will shear the adhesive connection between the exterior surface 128 of the adhesive layer 120 and the skin of the wearer as the first and second paths 141, 143 are brought substantially parallel to one another. Once the removal element 112 is brought into the second configuration, end section 130A or end section 130 may be pulled (e.g., in the z-direction and/or the y-direction) to further disrupt any remaining adhesive connection at an interface of the exterior surface 128 of the adhesive layer 120 and the skin of the wearer, resulting in easier removal of the device 100.

Figure 6A:
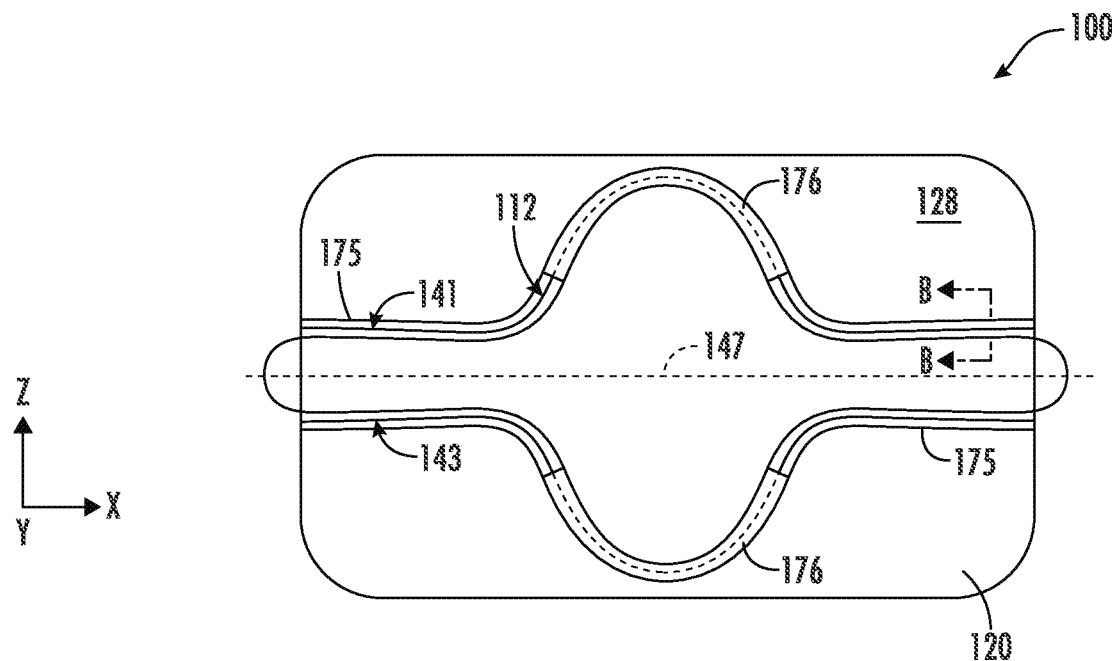
FIG. 6A illustrates a bottom view of another adhesive layer according to various embodiments of the present disclosure.
Figure 6B:
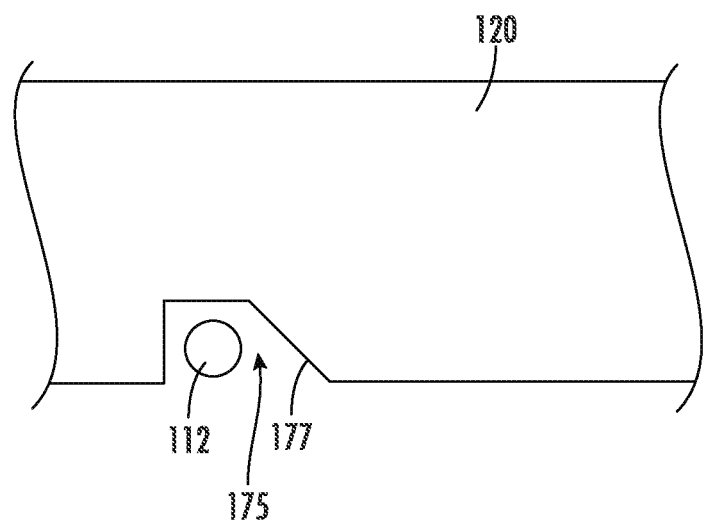
FIG. 6B illustrates a cross-sectional view of a portion of the adhesive layer, taken along cutline B-B in FIG. 6A, according to various embodiments of the present disclosure.

In some embodiments, as shown in FIGS. 6A-6B, the removal element 112 may be fully or partially recessed within an embedded channel 175 of the adhesive layer 120. For example, the embedded channel 175 may be a valley or indentation extending towards the pad (not shown) of the device 100. The embedded channel 175 may be open, covered, or partially covered by one or more sections 176 of adhesive. In some embodiments, the sections 176 may include one or more weakened sections, e.g., perforations, which allow the removal element 112 to break therethrough when engaged. During use, the embedded channel 175 may prevent the removal element 112 from being in direct contact with the skin of the wearer until removal of the device 100 is desired. Similar to the approaches described above, the removal element 112 may move from a first configuration, in which the first and second paths 141, 143 are positioned within the embedded channel 175, to a second configuration in which the first and second paths 141, 143 have exited the embedded channel 175 and move towards the lengthwise axis 147, between an interface of the exterior surface 128 of the adhesive layer 120 and the skin of the wearer. In some embodiments, the embedded channel 175 may include a sloped surface 177 to allow the removal element 112 to exit the embedded channel 175 more easily.

Figure 7:
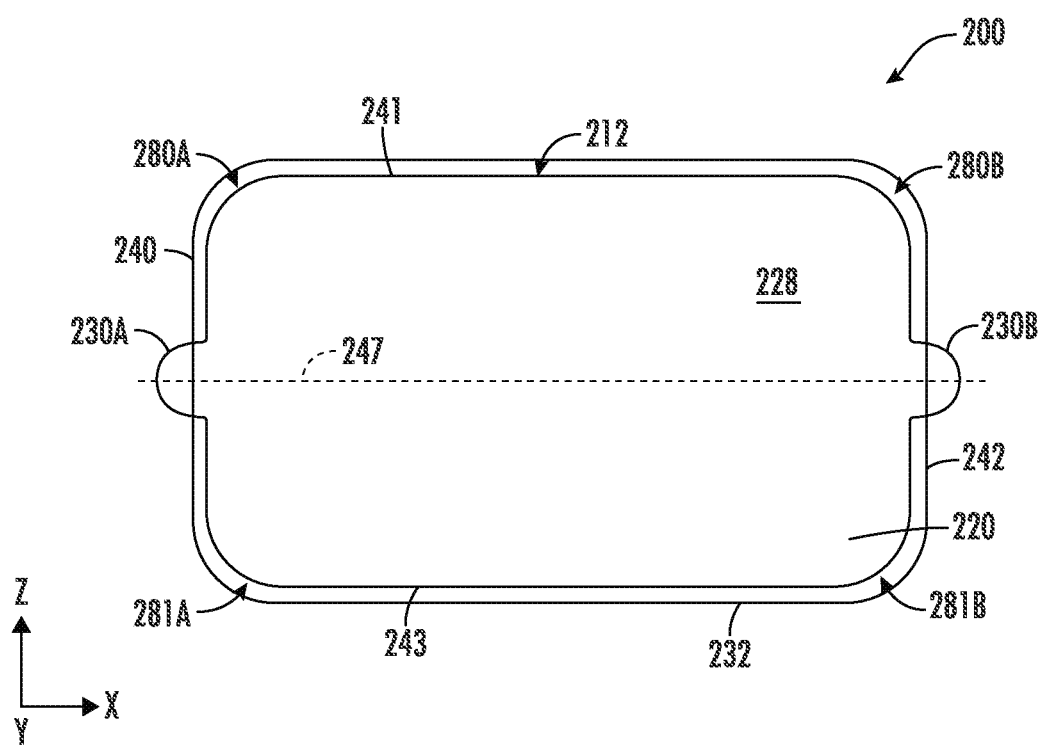
FIG. 7 illustrates a bottom view of a device according to various embodiments of the present disclosure.

Turning now to FIG. 7, a bottom view of a wearable drug delivery device (hereinafter "device") 200 according to embodiments of the present disclosure will be described. The device 200 may be similar to the device 100 described herein. As such, only certain aspects of the device 200 will hereinafter be described for the sake of brevity. As shown, a removal element 212 is arranged along an exterior surface 228 of an adhesive layer 220, wherein the adhesive layer 220 is attachable to a wearer's skin. In this embodiment, the removal element 212 may be a continuous/closed loop of material, such as a metal, a polymer, or a nylon string. For example, the removal element may be a wire element laminated onto the exterior surface 228 of the adhesive layer 120.

As shown, the removal element 212 may include an end section 230A extending beyond a first end 240 of the adhesive layer 220, and an end section 230B extending beyond a second end 242 of the adhesive layer 220. In the configuration shown, a central section 234 of the removal element 212 may generally follow or extend along a perimeter 232 of the adhesive layer 220. When the device 200 is to be removed from the skin of the wearer, end sections 230A, 230B of the removal element 212 may be engaged to cause the first and second paths 241, 243 to move centrally towards a lengthwise axis 247. In one embodiment, the end sections 230A, 230B may move laterally in opposite directions, e.g., along the lengthwise axis 247, in response to a pulling force. As the end sections 230A, 230B move away from respective first and second ends 240, 242 of the adhesive layer 220, the resultant forces on corners 280A, 280B of the first path 241 and corners 281A, 281B of the second path 243 cause the removal element 212 to move towards the lengthwise axis 247. As a result, the first and second paths 241, 243 of the removal element 212 shear an adhesive connection between the exterior surface 228 of the adhesive layer 220 and the skin of the wearer.

Figure 8:
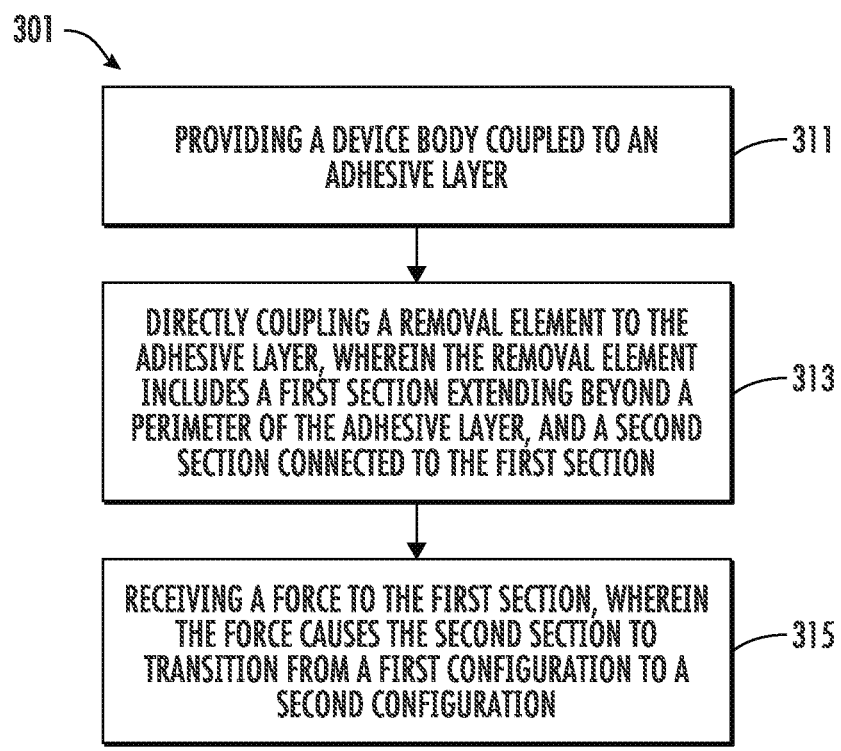
FIG. 8 illustrates a method according to embodiments of the present disclosure.

FIG. 8 illustrates a method 301 for removing a wearable drug delivery device in accordance with the embodiments described herein. At block 311, the method 301 may include providing a device body coupled to an adhesive layer. In some embodiments, the adhesive layer may be attached to an underside of a pad, which may be coupled or attached to a bottom surface of a base of the device body. In some embodiments, the adhesive layer may be a pressure sensitive acrylic-based adhesive with a woven or non-woven backing. In some embodiments, the adhesive layer may be constructed from silicone, a synthetic rubber, hydrocolloid, and/or hydrogel.

At block 313, the method 301 may include directly coupling a removal element to the adhesive layer, wherein the removal element includes an end section extending beyond a perimeter of the adhesive layer, and a central section connected to the end section. In some embodiments, the end section is configured as a loop extending from a first and/or second end of the adhesive layer. In some embodiments, the removal element is a continuous loop of material. In some embodiments, the removal element may be constructed from a metal, a polymer, or a nylon. In some embodiments, the removal element may be a flexible biocompatible material. In some embodiments, the removal element may include a first path including a first plurality of peaks, and a second path including a second plurality of peaks.

At block 315, the method 301 may include receiving a force to the end section, wherein the force causes the central section to transition from a first configuration to a second configuration. Transitioning the central section from the first configuration to the second configuration may cause the adhesive layer to partially detach from a skin of a wearer. In some embodiments, the method 301 includes extending the central section towards the perimeter of the adhesive layer in the first configuration, and moving the central section towards a lengthwise axis of the adhesive layer in response to the force, wherein the force is applied in a direction extending away from the device body. In some embodiments, the method 301 may include orienting the central section parallel to the lengthwise axis in the second configuration. In some embodiments, the central section may be arranged in a series of peaks and valleys along the exterior surface of the adhesive layer when the central section is in the first configuration.

In some embodiments, the method 301 may include coupling the central section to the adhesive layer at a perforated connection. In some embodiments, the method 301 may include coupling a reinforcement member to the central section. In some embodiments, the method may include extending a main element of the removal element within a conduit coupled to the adhesive layer, and connecting a plurality of arm elements to the main element, wherein the plurality of arm elements extend through the conduit. In some embodiments, the method 301 may include coupling a detachment element to the plurality of arm elements, wherein the detachment element is positioned along an exterior surface of the adhesive layer, and wherein the detachment element is one of: a rigid rod coupled to each of the plurality of arm elements, and a loop coupled to each of the plurality of arm elements. In some embodiments, the method may include providing an adhesive along an exterior surface of each of the loops.

Turning now to FIGS. 9A-9C, a bottom view of a wearable drug delivery device (hereinafter "device") 300 according to embodiments of the present disclosure will be described. The device 300 may be similar to the devices 100 and 200 described herein. As such, only certain aspects of the device 300 will hereinafter be described for the sake of brevity. As shown, a removal element 312 is arranged along an exterior surface 328 of an adhesive layer 320, wherein the adhesive layer 320 is attachable to a wearer's skin. In some embodiments, the removal element 312 may be a portion or section of the adhesive layer 320, wherein the removal element 312 is coupled to the adhesive layer 320 at a perforated interface or connection 337. In various embodiments, the removal element 312 may be co-planar with the exterior surface 328 of the adhesive layer 320 or recessed into the adhesive layer 320. As further shown, a central section 334 of the removal element 312 may include a reinforcement member 340 (e.g., flexible wire) extending along a length thereof. In some embodiments, the reinforcement member 340 may be embedded within a central section 334 of the removal element 312, e.g., between multiple layers.

As shown, the removal element 312 may include end section 330A opposite end section 330B, wherein at least one of the end sections 330A, 330B may include a rigid or reinforced tip 333, which may be a tab, loop, or other engageable feature. In an initial configuration, such as the configuration shown in FIG. 9A, the reinforced tip 333 may be positioned within a perimeter 335 of the adhesive layer 320. In other embodiments, all or a portion of the reinforced tip 333 may extend beyond/outside the perimeter 335. As demonstrated, the removal element 312 may include a series of peaks and valleys in a folded or zig-zag arrangement.

During use, to remove the device 300 from the skin of the wearer, a force 'F' may be applied to the reinforced tip 333 of the removal element 312, as shown in FIG. 9A. Although non-limiting, the force may be applied parallel to a lengthwise axis 'LA' of the device 300. The force may result in rotational shear, linear shear, and/or linear peeling along the removal element 312, which causes the central section 334 to detach from the adhesive layer 320 at the perforated connection 337. As the removal element 312 continues to unfold/expand, demonstrated in FIGS. 9B-9C, the removal element 312 generally straightens and moves towards the lengthwise axis, shearing an adhesive connection between the adhesive layer 320 and the wearer's skin.

Although non-limiting, the removal element 312 may include an adhesive along an exterior surface 342 thereof. This adhesive may be relatively stronger or weaker than the adhesive of the adhesive layer 320. In other embodiments, no adhesive is present along the exterior surface 342 of the removal element 312.

Turning now to FIGS. 10A-10E, a bottom view of a wearable drug delivery device (hereinafter "device") 400 according to embodiments of the present disclosure will be described. The device 400 may be similar to the device 300 described herein. As such, only certain aspects of the device 400 will hereinafter be described for the sake of brevity. As shown, a removal element 412 is arranged in a serpentine pattern across an adhesive layer 420, wherein the adhesive layer 420 is attachable to a wearer's skin. In some embodiments, the removal element 412 may be a portion or section of the adhesive layer 420, and the removal element 412 may be coupled to a remainder of the adhesive layer 420 or to other sections of the removal element 412 at an interface 437. Alternatively, the removal element 412 may make up the entire surface of adhesive layer 420. In some embodiments, the interface 437 may be a slotted or perforated. Furthermore, the removal element 412 may be co-planar with an exterior surface 428 of the adhesive layer 420 or recessed into the adhesive layer 420. As shown, a periphery of the removal element 412 may include a flexible release wire 440 (e.g., metal wire) extending along a serpentine length thereof. More specifically, in some embodiments, the release wire 440 may be positioned beneath/between the interface 437. During removal, the release wire 440 may cut or break through the interface 437 when pulled. In some embodiments, the release wire 440 may include a release tab 448 at an end thereof.

As shown, the removal element 412 may include a central section 434 between opposite end sections 430A and 430B, wherein at least one of the end sections 430A, 430B may include a rigid or reinforced tip 433, which may be a tab, loop, or other engageable feature. In an initial configuration, such as the configuration shown in FIG. 10A, the release tab 448 and the reinforced tip 433 may be positioned within a perimeter 435 of the adhesive layer 420. In other embodiments, all or a portion of the release tab 448 and/or the reinforced tip 433 may extend beyond/outside the perimeter 435. As demonstrated, the removal element 412 and the release wire 440 may include a series of peaks and valleys in a folded, serpentine, or zig-zag arrangement, for example.

During use, to remove the device 400 from the skin of the wearer, a force 'F' may be applied first to the release tab 448 of the release wire 440, as shown in FIG. 10A. The release wire 440 may be pulled from the device 400, cutting or breaking through the adhesive layer 420 at the interface 437 as the release wire 440 changes configuration. The release wire 440 may be entirely removed from the device 400, as shown in FIG. 10C, and a second force, 'F2' may be applied to the reinforced tip 433 of the removal element 412 to begin pulling the removal element 412 from the adhesive layer 420. The second force may result in rotational shear, linear shear, and/or linear peeling along the removal element 412, which causes the central section 434 to detach from the adhesive layer 420, as demonstrated in FIGS. 10D-10E. As the removal element 412 continues to unfold/expand, the removal element 412 generally straightens and moves towards a center of the device 400, shearing an adhesive connection between the adhesive layer 420 and the wearer's skin.

Although non-limiting, the removal element 412 may include an adhesive along an exterior surface 442 thereof. This adhesive may be relatively stronger or weaker than the adhesive of the adhesive layer 420. In other embodiments, no adhesive is present along the exterior surface 442 of the removal element 412.

Figure 11A:
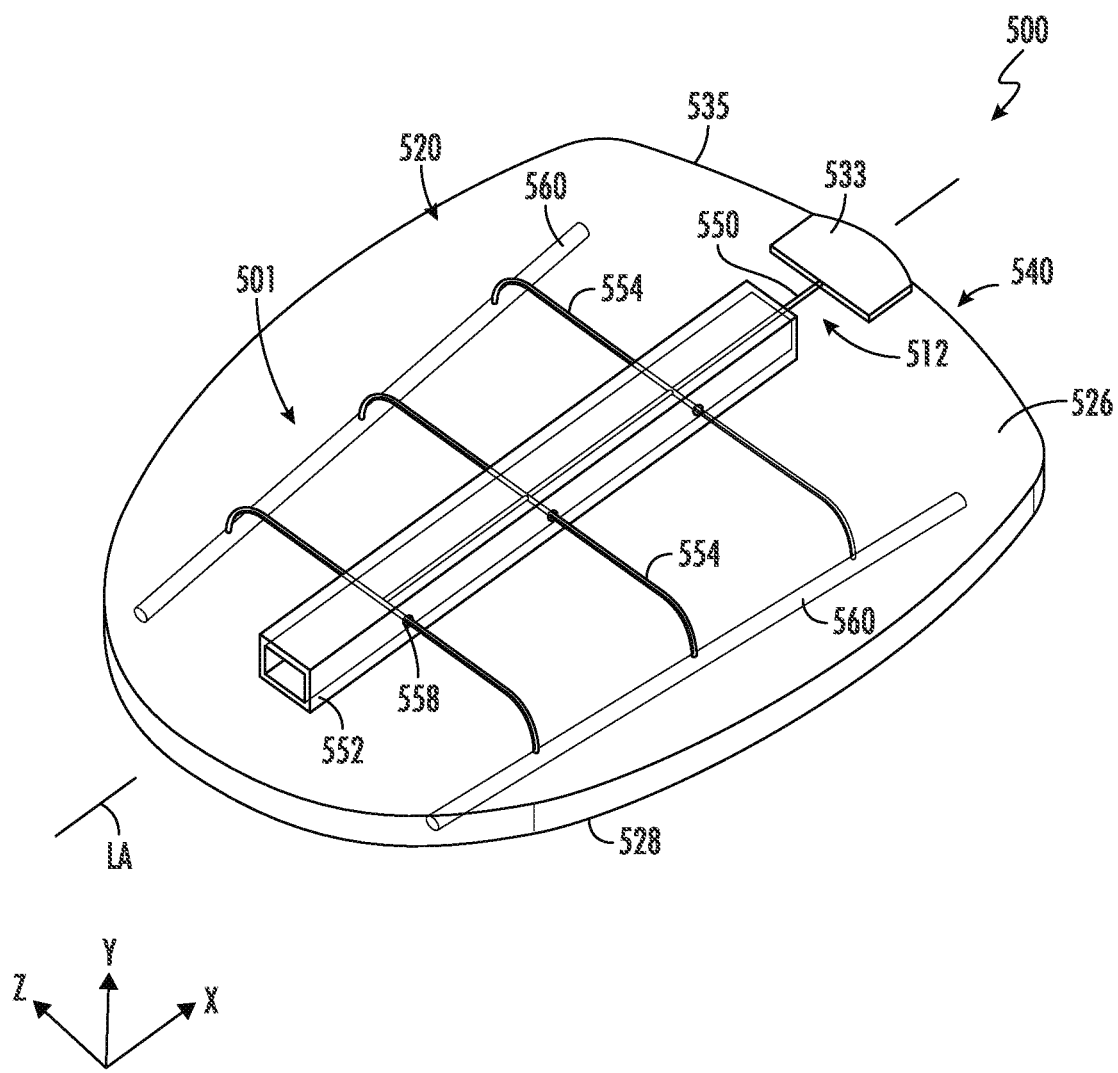
FIG. 11A illustrates a perspective view of a device according to embodiments of the present disclosure.
Figure 11B:
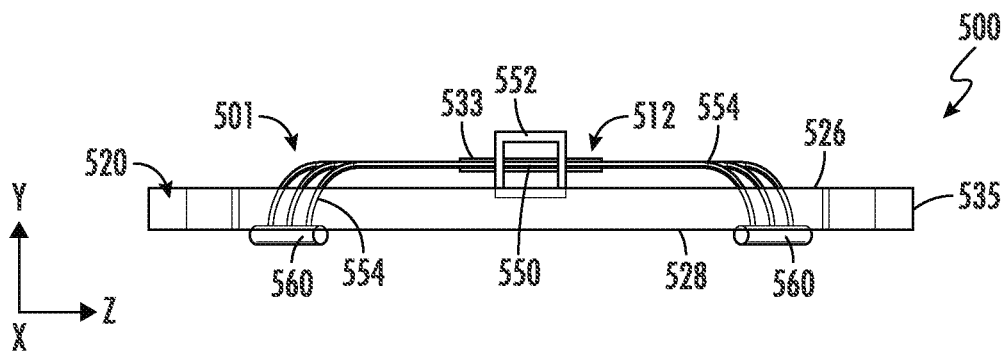
FIG. 11B illustrates an end view of the device depicted in FIG. 11A according to embodiments of the present disclosure.
Figure 11C:
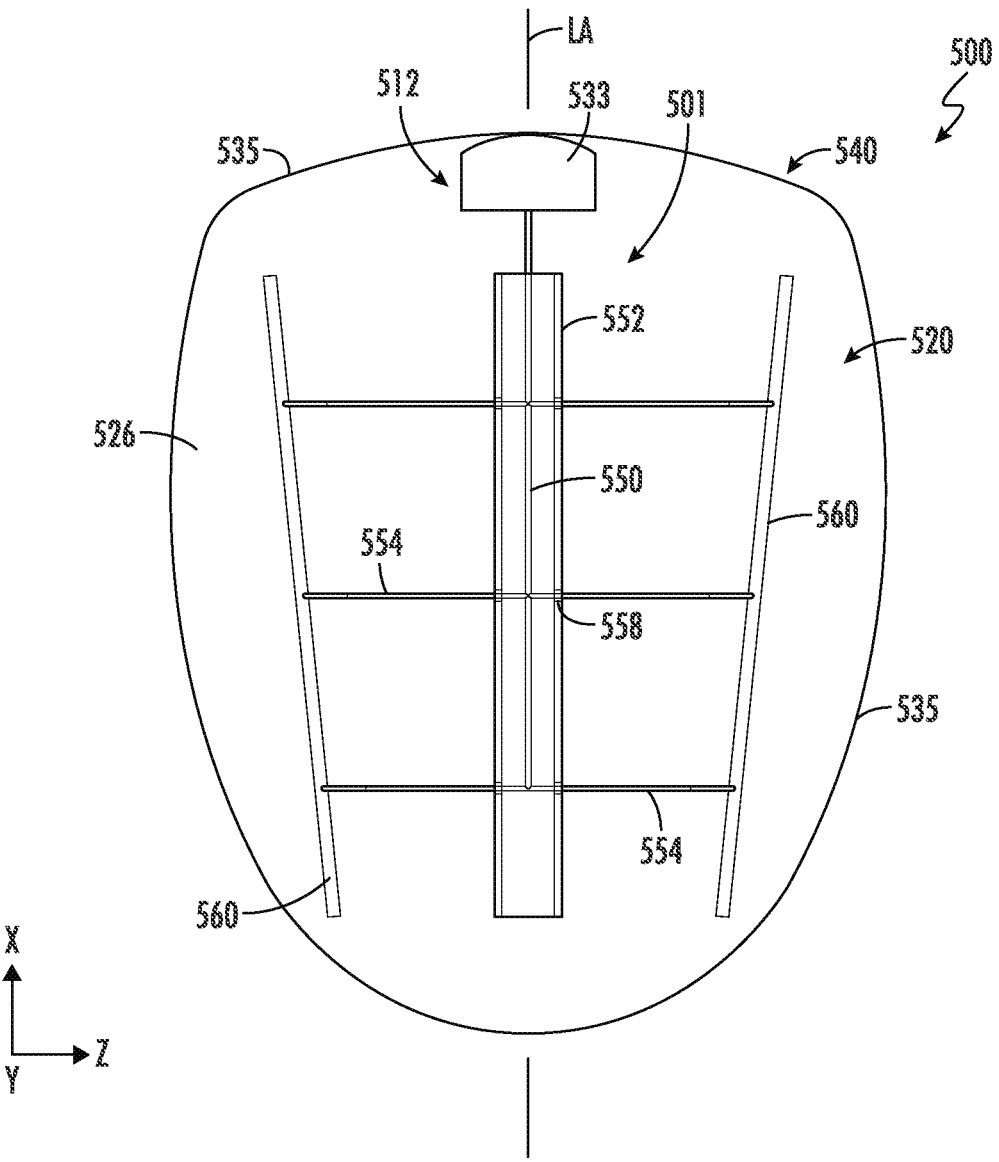
FIG. 11C illustrates a top view of the device depicted in FIG. 11A according to embodiments of the present disclosure.

Turning now to FIGS. 11A-11C, a removal system 501 of a wearable drug delivery device (hereinafter "device") 500 according to embodiments of the present disclosure will be described. Although only a portion of the device 500 is shown for clarity, the device 500 may include any or all of the features of devices 100, 200, 300, and/or 400 described herein. As shown, the removal system 501 includes a removal element 512 arranged along both an exterior surface 528 and an interior surface 526 of an adhesive layer 520, wherein the adhesive layer 520 secures the device 500 to a wearer's skin. The removal element 512 may include a main element 550 extending within a conduit 552, and a plurality of arm elements 554 extending from the main element 550. Although shown as coupled to the interior surface 526 of the adhesive layer 520, the conduit 552 may be coupled to the exterior surface 528 or embedded within the adhesive layer 520 in other embodiments.

As shown, the main element 550 may extend along a lengthwise axis 'LA' of the device 500, while the arm elements 554 may extend transverse to the main element 550. The arm elements 554 may connect with the main element 550 through openings 558 of the conduit 552. In this embodiment, the main element 550 and the arm elements 554 may be a flexible or semi-rigid wire or string material. Furthermore, the arm elements 554 may pass through the adhesive layer 520 for connection with one or more detachment elements 560. As best demonstrated in FIG. 11B, the detachment elements 560 are positioned along the exterior surface 528 of the adhesive layer 520. The detachment elements 560 may be a rigid rod or tube positioned adjacent a perimeter 535 of the adhesive layer 520. In various embodiments, the detachment elements 560 may be non-adhesive or include an adhesive surface.

In some embodiments, the removal element 512 may include a rigid or reinforced tip 533, which may be a tab, loop, or other engageable feature. In an initial configuration, the tip 533 may be positioned within the perimeter 535 of the adhesive layer 520. In other embodiments, all or a portion of the tip 533 may extend beyond/outside the perimeter 535. Furthermore, although shown as positioned above the interior surface 526, the tip 533 may be positioned along the exterior surface 528 or between the interior and exterior surfaces 526, 528 in other embodiments.

During use, to remove the device 500 from the skin of the wearer, a force may be applied to the tip 533 of the removal element 512. Although non-limiting, the force may be applied along, or parallel to, the lengthwise axis of the device 500. The force may cause the main element 550 to move towards a first end 540 of the adhesive layer 520 and the arm elements 554 to move towards the conduit 552. The arm elements 554 in turn pull the detachment elements 560 towards the conduit 552, resulting in rotational shear, linear shear, and/or linear peeling between the adhesive layer 520 and the wearer's skin. In some embodiments, the detachment elements 560 may crumple the adhesive layer 520 as the detachment elements 560 are brought towards the lengthwise axis. Furthermore, a height difference (e.g., along the y-direction) between the conduit 552 and the detachment elements 560 is increased as the tip 533 is pulled, resulting in an increased upward (e.g., along the y-direction) force, which causes peeling and folding of the adhesive layer 520.

Figure 12A:
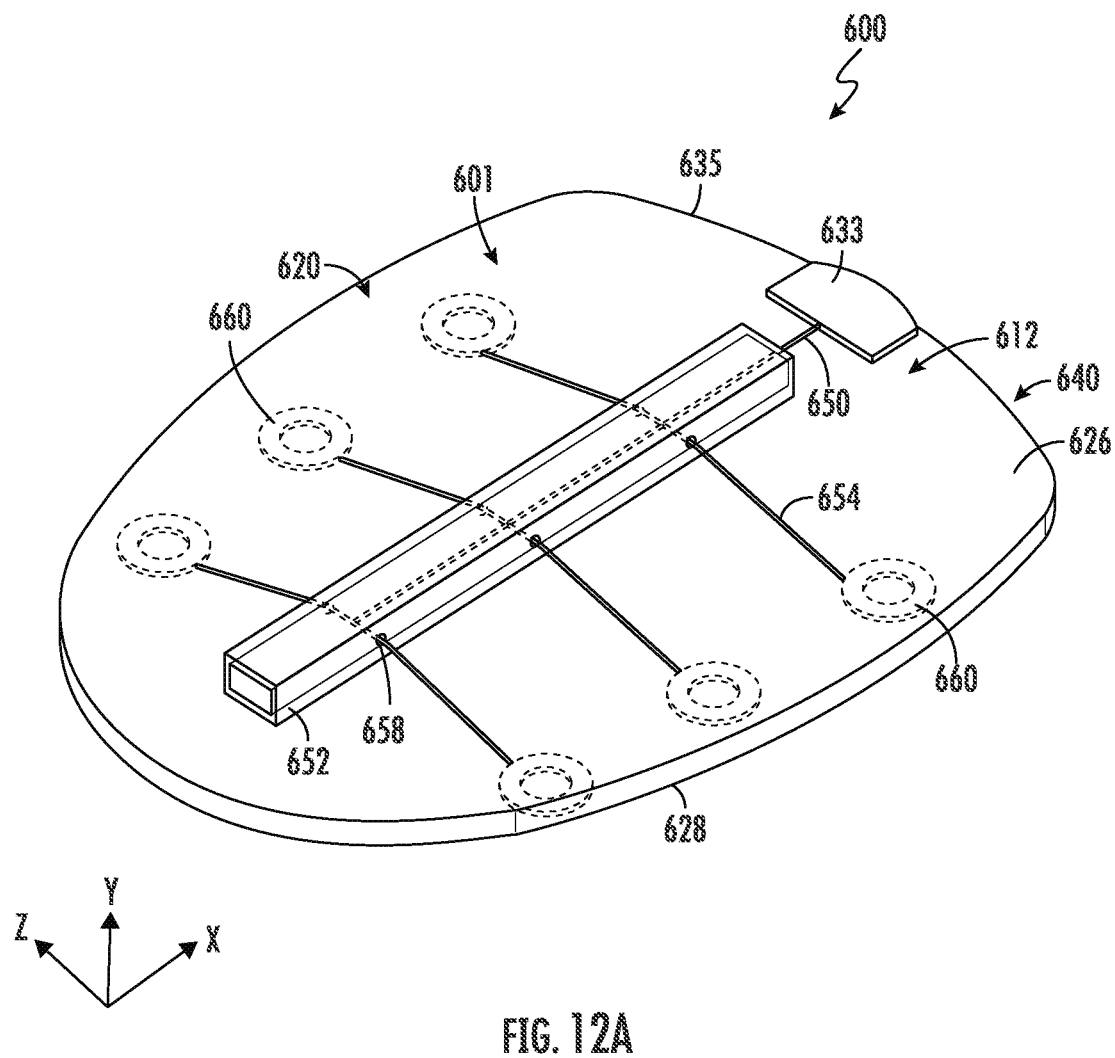
FIG. 12A illustrates a perspective view of a device according to embodiments of the present disclosure.
Figure 12B:
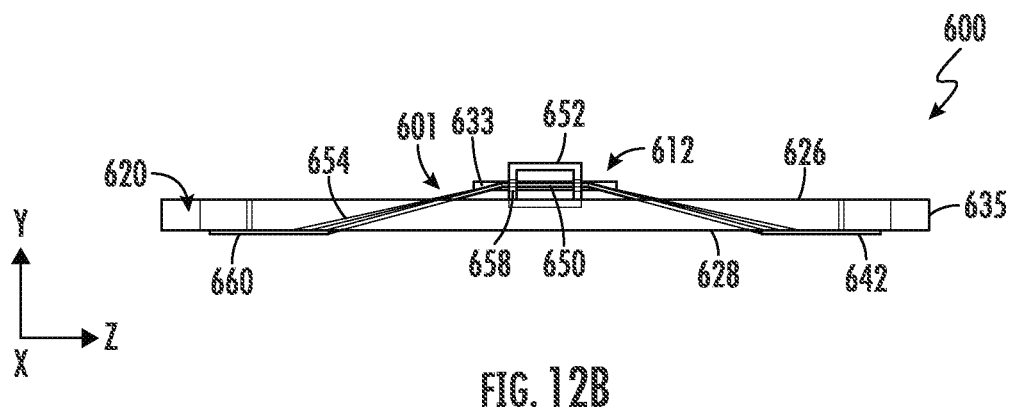
FIG. 12B illustrates an end view of the device depicted in FIG. 12A according to embodiments of the present disclosure.
Figure 12C:
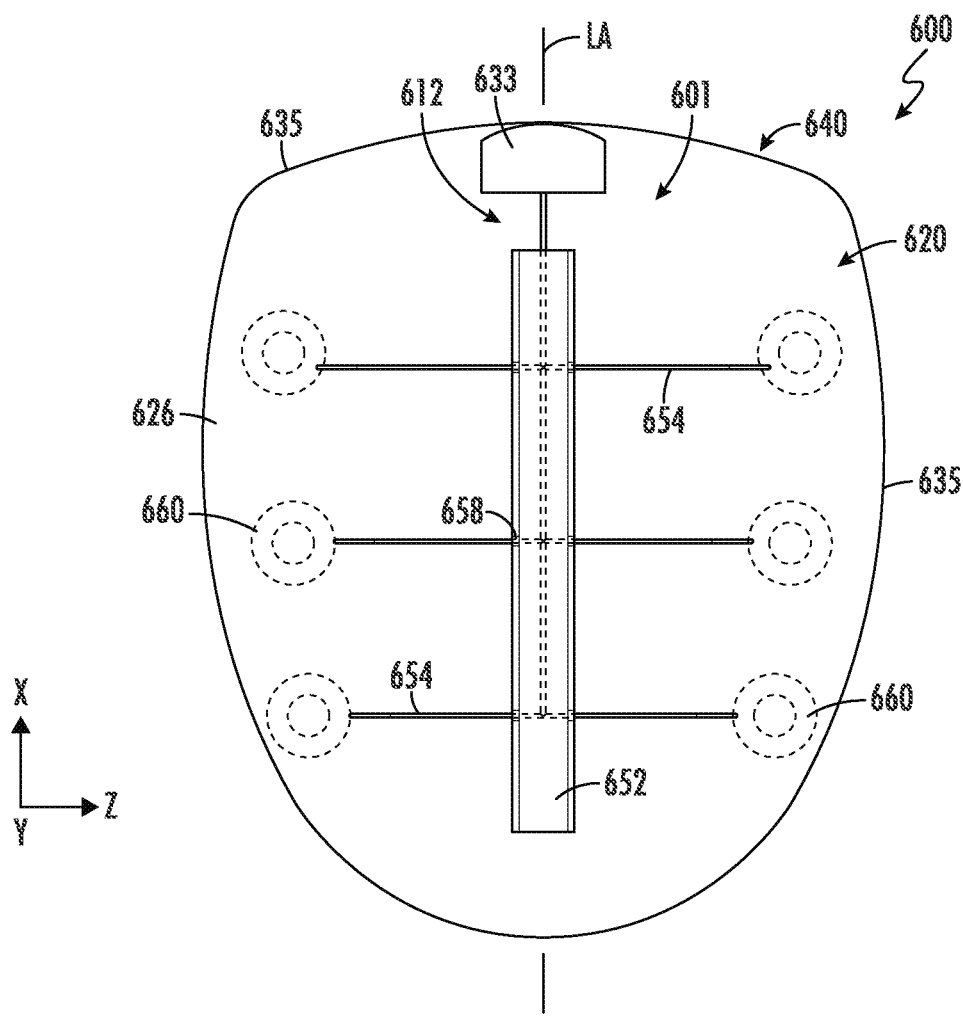
FIG. 12C illustrates a top view of the device depicted in FIG. 12A according to embodiments of the present disclosure.

Turning now to FIGS. 12A-12C, a removal system 601 of a wearable drug delivery device (hereinafter "device") 600 according to embodiments of the present disclosure will be described. Although only a portion of the device 600 is shown for clarity, the device 600 may include any or all of the features of the devices described herein. As shown, the removal system 601 includes a removal element 612 arranged along both an exterior surface 628 and an interior surface 626 of an adhesive layer 620, wherein the adhesive layer 620 is securable to a wearer's skin. The removal element 612 may include a main element 650 extending within a conduit 652, and a plurality of arm elements 654 extending from the main element 650. Although shown as coupled to the interior surface 626 of the adhesive layer 620, the conduit 652 may be coupled to the exterior surface 628 or embedded within the adhesive layer 620 in other embodiments.

As shown, the main element 650 may extend along a lengthwise axis 'LA' of the device 600, while the arm elements 654 may extend transverse to the main element 650. The arm elements 654 may connect with the main element 650 through openings 658 of the conduit 652. In this embodiment, the main element 650 and the arm elements 654 may be a flexible or semi-rigid wire or string material. Furthermore, the arm elements 654 may pass through the adhesive layer 620 for connection with one or more detachment elements 660. As best demonstrated in FIG. 12B, the detachment elements 660 are positioned along the exterior surface 628 of the adhesive layer 620. The detachment elements 660 may be flat discs, as shown, or an additional wire length configured as a loop or other shape. Embodiments herein are not limited in this context.

During use, to remove the device 600 from the skin of the wearer, a force may be applied, along the lengthwise axis, to a tip 633 of the removal element 612. The force may cause the main element 650 to move towards a first end 640 of the adhesive layer 620 and the arm elements 654 to move towards the conduit 652. The arm elements 654 in turn pull the detachment elements 660 towards the conduit, resulting in rotational shear, linear shear, and/or linear peeling between the adhesive layer 620 and the wearer's skin. In some embodiments, the detachment elements 660 may crumple the adhesive layer 620 as the detachment elements 660 are brought towards the lengthwise axis.

Although non-limiting, the detachment elements 660 may include an adhesive along an exterior surface 642 (FIG. 12B) thereof. This adhesive may be relatively stronger or weaker than the adhesive of the adhesive layer 620. In other embodiments, no adhesive is present along the exterior surface 642 of the detachment elements 660. In yet other embodiments, an adhesive of the adhesive layer 620 within an interior of each detachment element 660 may be stronger than the adhesive of the remainder of the adhesive layer 620. When the removal element 612 is pulled, the detachment elements 660 separate the wearer's skin from the stronger portions of the adhesive, making the remaining parts easier to peel.

Figure 13:
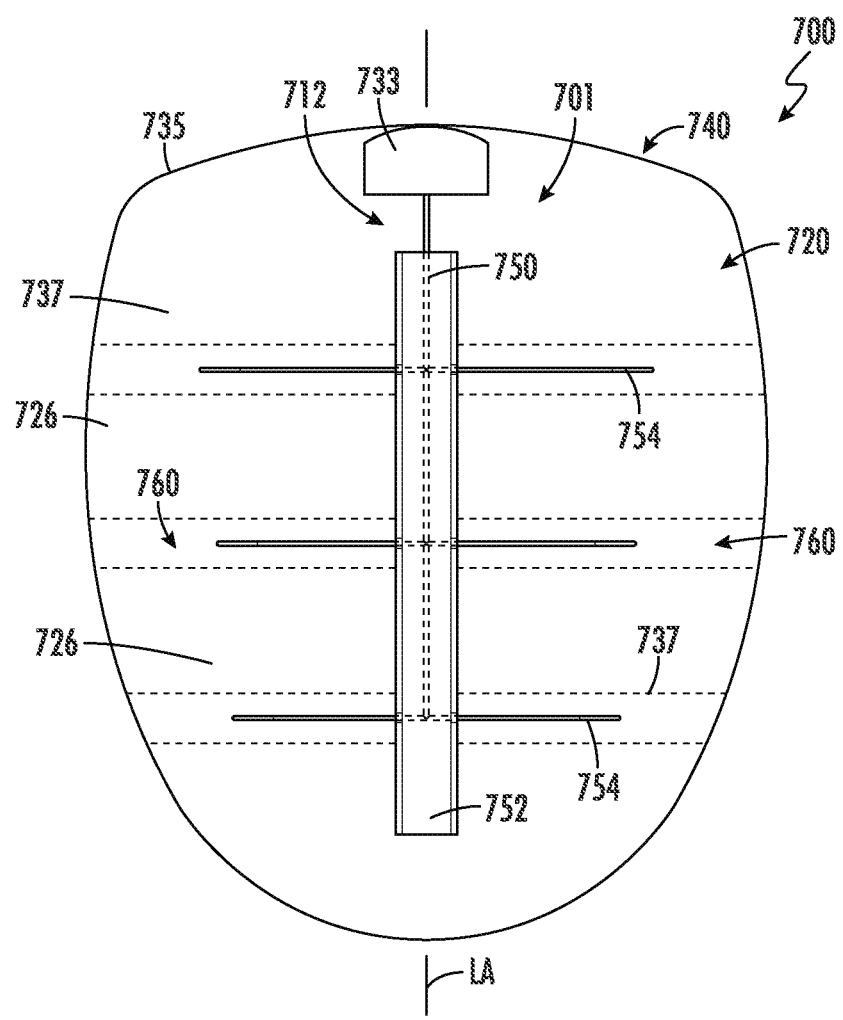
FIG. 13 illustrates a top view of a device according to embodiments of the present disclosure.

Turning now to FIG. 13, a removal system 701 of a wearable drug delivery device (hereinafter "device") 700 according to embodiments of the present disclosure will be described. Although only a portion of the device 700 is shown for clarity, the device 700 may include any or all of the features of the devices described herein. As shown, the removal system 701 includes a removal element 712 coupled to an adhesive layer 720, wherein the adhesive layer 720 is securable to a wearer's skin. The removal element 712 may include a main element 750 extending within a conduit 752, and a plurality of arm elements 754 extending from the main element 750. In other embodiments no conduit 752 is present.

As shown, the main element 750 may extend along a lengthwise axis 'LA' of the device 700, while the arm elements 754 may extend transverse to the main element 750. The arm elements 754 may connect with the main element 750 through openings of the conduit 672. In this embodiment, the main element 750 and the arm elements 754 may be a flexible or semi-rigid wire or string material.

As further shown, the arm elements 754 may be coupled to a plurality of removal portions 760 of the adhesive layer 720. For example, the arm elements 754 may be embedded within the removal portions 760. In various embodiments, the removal portions 760 may be co-planar with the exterior surface of the adhesive layer 720, or the removal portions 760 may be recessed into the adhesive layer 720. The removal portions 760 may be connected to the adhesive layer 720 at a perforated interface or connection 737.

During use, to remove the device 700 from the skin of the wearer, a force may be applied, along the lengthwise axis, to a tip 733 of the removal element 712. The force may cause the main element 750 to move towards a first end 740 of the adhesive layer 720, and the arm elements 754 to move towards the conduit 752. The arm elements 754 in turn pull the removal portions 760 towards the conduit, resulting in rotational shear, linear shear, and/or linear peeling between the removal portions 760 and the wearer's skin.

Although non-limiting, the removal portions 760 may include an adhesive along an exterior surface in contact with the wearer's skin. This adhesive may be relatively stronger or weaker than the adhesive of the adhesive layer 720. In other embodiments, no adhesive is present along the exterior surface of the removal portions 760.

Figure 14A:
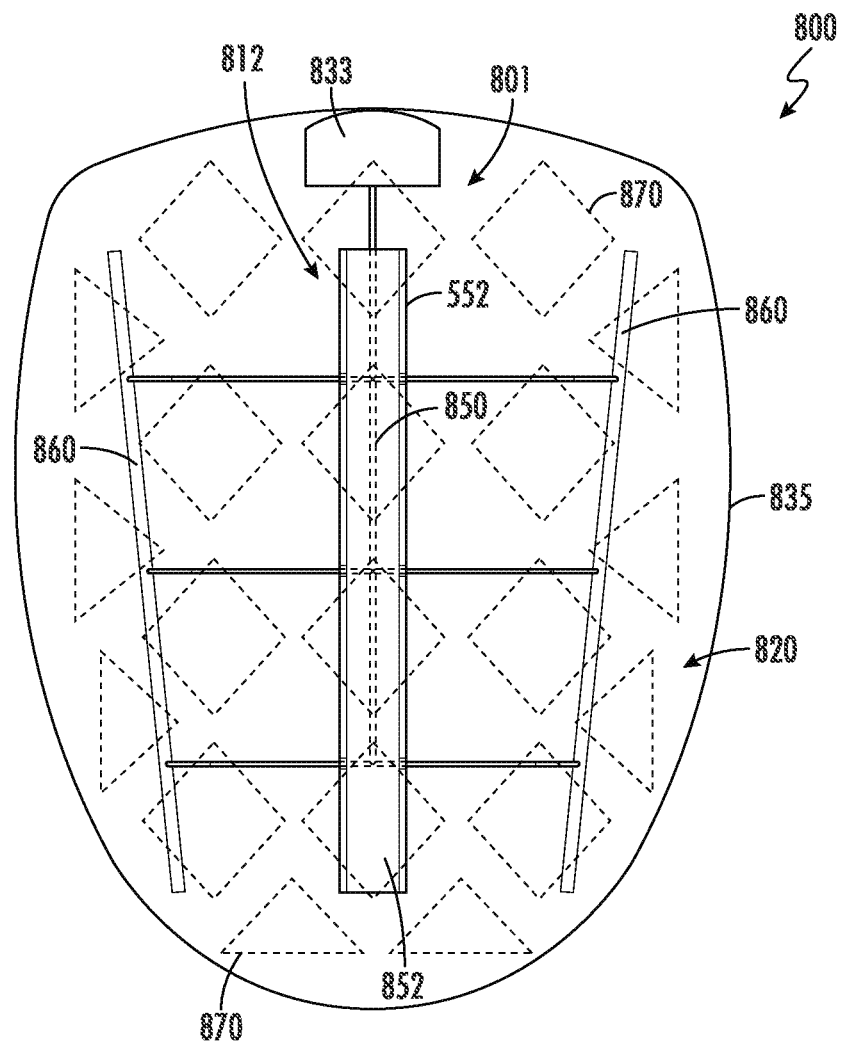
FIG. 14A illustrates a top view of a device according to embodiments of the present disclosure.
Figure 14B:
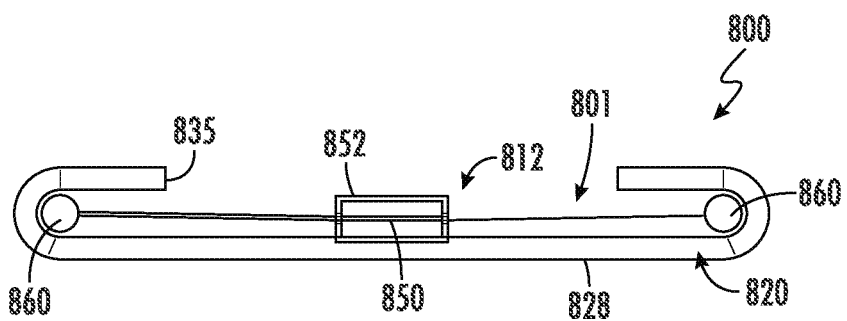
FIG. 14B illustrates an end view of the device depicted in FIG. 14A according to embodiments of the present disclosure.

Turning now to FIGS. 14A-14B, a removal system 801 of a wearable drug delivery device (hereinafter "device") 800 according to embodiments of the present disclosure will be described. Although only a portion of the device 800 is shown for clarity, the device 800 may include any or all of the features of the devices described herein. In this embodiment, the removal system 801 includes a removal element 812 coupled to an adhesive layer 820, the removal element 812 including a main element 850 extending within a conduit 852. A plurality of rigid arm elements 854 may extend laterally from the main element 850. As shown, the arm elements 854 may connect with one or more detachment elements 860. Although non-limiting, the detachment elements 860 may be a rigid rod or tube positioned adjacent a perimeter 835 of the adhesive layer 820.

As shown, the adhesive layer 820 may include a plurality of cutouts 870 to encourage shearing between the adhesive layer 820 and a wearer's skin during removal. The cutouts 870 may be openings through the adhesive layer 820, or they may be areas of the adhesive layer 820 without any adhesive along an exterior surface 828. In some embodiments, a pulling force on a tip 833 of the main element 850 causes the detachment elements 860 to stretch the adhesive layer 820 over the arm elements 854 extending from the conduit 852, as demonstrated in FIG. 14B. Stretching of the adhesive layer 820 weakens the overall bond strength between the adhesive and skin, making it easier to remove the device 800. The adhesive layer 820 with cutouts 870 may be incorporated into any of the devices or embodiments described herein.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments also incorporating the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

All directional references (e.g., proximal, upper, lower, upward, downward, left, right, lateral, longitudinal, front, back, top, bottom, above, below, vertical, horizontal, etc.) are only used for identification purposes to aid the reader's understanding of the present disclosure. The directional references do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer two elements are directly connected and in fixed relation to each other.

Still furthermore, although the illustrative method 301 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be necessary to implement a methodology in accordance with the present disclosure. Furthermore, the method 301 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A wearable drug delivery device, comprising:
   a device body coupled to an adhesive layer; and
   a removal element consisting of a loop of cord, string, rope, or wire, having a surface area smaller than the adhesive layer and disposed or embedded in the adhesive layer and configured to be, when the wearable drug delivery device is affixed to a user's skin, between at least a part of the adhesive layer and the user's skin, wherein the removal element comprises:
   an end section proximate a perimeter of the adhesive layer; and
   a central section connected to the end section, wherein the central section follows a path through the adhesive layer so that a material of the removal element has an overall shape comprising first and second paths parallel to a lengthwise axis of the central section and a plurality of peaks extending from the first and second paths, respectively, away from the lengthwise axis and towards the perimeter of the adhesive layer but not contacting the perimeter of the adhesive layer when the central section is in a first configuration, the removal element in the first configuration having a different shape from the adhesive layer, and a force applied to the end section causes the central section to transition between the first configuration and a second configuration, the transition causing the removal element to move along a surface of the adhesive layer to shear a connection between the adhesive layer and the user's skin.

2. The wearable drug delivery device of claim 1, wherein the central section is positioned proximate the perimeter of the adhesive layer in the first configuration, and wherein the central section moves towards a lengthwise axis of the adhesive layer in the second configuration.

3. The wearable drug delivery device of claim 1, further comprising a pad between the device body and the adhesive layer.

4. The wearable drug delivery device of claim 3, wherein the removal element is positioned either between the pad and the adhesive layer, or along an exterior surface of the adhesive layer.

5. The wearable drug delivery device of claim 1, wherein the adhesive layer includes a first end opposite a second end and a first side opposite a second side, and wherein the removal element extends beyond the perimeter of the adhesive layer along the first end or the second end.

6. A removal system for a wearable drug delivery device, comprising:
   a removal element that is disposed on or embedded in an adhesive layer and configured to be, when the wearable drug delivery device is affixed to a user's skin, between at least a part of the adhesive layer and the user's skin, the removal element comprising a continuous loop of cord, string, rope, or wire, having a surface area smaller than the adhesive layer forming:
   an end section proximate a perimeter of the adhesive layer; and
   a central section connected to the end section, the central section following a path through the adhesive layer so that a material of the removal element has an overall shape comprising first and second paths parallel to a lengthwise axis of the central section and at least one peak extending from the first and second paths, respectively, away from the lengthwise axis and towards the perimeter of the adhesive layer without contacting the perimeter of the adhesive layer, wherein a force applied to the end section causes the central section to transition between a first configuration having a different shape than the adhesive layer and a second configuration to move the removal element along a surface of the adhesive layer to shear a connection between the adhesive layer and the user's skin.

7. The removal system of claim 6, wherein the central section is positioned proximate the perimeter of the adhesive layer in the first configuration, wherein the central section moves towards a lengthwise axis of the adhesive layer in the second configuration, and wherein the central section comprises a plurality of peaks extending towards the perimeter of the adhesive layer when the central section is in the first configuration.

8. The removal system of claim 6, further comprising a pad between a device body and the adhesive layer.

9. The removal system of claim 8, wherein the removal element is positioned between the pad and the adhesive layer.

10. The removal system of claim 6, wherein the adhesive layer includes a first end opposite a second end and a first side opposite a second side, and wherein the removal element extends beyond the perimeter of the adhesive layer along the first end or the second end.

11. The wearable drug delivery device of claim 1, wherein the removal element has a diameter of 0.001 to 0.002 inches.

12. The wearable drug delivery device of claim 1, wherein the removal element is stainless steel, nylon, polyethylene, or polyester.

13. The wearable drug delivery device of claim 1, wherein the end section is a first end section which extends, beyond the perimeter of the adhesive layer and the removal element further comprises a second end section opposite the first end section that extends beyond the perimeter of the adhesive layer.

* * * * *